US011488456B2

(12) United States Patent
Mori et al.

(10) Patent No.: US 11,488,456 B2
(45) Date of Patent: Nov. 1, 2022

(54) ARTICLE MANAGEMENT SYSTEM, ARTICLE MANAGEMENT APPARATUS, ARTICLE MANAGEMENT METHOD, AND STORAGE MEDIUM

(71) Applicant: NEC Corporation, Tokyo (JP)

(72) Inventors: Atsushi Mori, Tokyo (JP); Matsuhiro Usui, Tokyo (JP); Koyo Tani, Tokyo (JP)

(73) Assignee: NEC CORPORATION, Tokyo (JP)

(*) Notice: Subject to any disclaimer, the term of this patent is extended or adjusted under 35 U.S.C. 154(b) by 38 days.

(21) Appl. No.: 17/059,659

(22) PCT Filed: May 30, 2019

(86) PCT No.: PCT/JP2019/021647
§ 371 (c)(1),
(2) Date: Nov. 30, 2020

(87) PCT Pub. No.: WO2019/230925
PCT Pub. Date: Dec. 5, 2019

(65) Prior Publication Data
US 2021/0225134 A1 Jul. 22, 2021

(30) Foreign Application Priority Data

May 31, 2018 (JP) .............................. JP2018-105038

(51) Int. Cl.
G08B 13/14 (2006.01)
G07G 1/00 (2006.01)
(Continued)

(52) U.S. Cl.
CPC .......... G07G 1/009 (2013.01); G06K 19/0723 (2013.01); G06Q 10/087 (2013.01)

(58) Field of Classification Search
CPC .............. G07G 1/009; G06K 19/0723; G06K 7/10297; G06Q 10/087; G06Q 20/208; G06Q 30/06
(Continued)

(56) References Cited

U.S. PATENT DOCUMENTS 5,745,036 A * 4/1998 Clare ................. G08B 13/2448
340/572.1
6,195,006 B1 * 2/2001 Bowers .................. G06K 17/00
340/568.1
(Continued)

FOREIGN PATENT DOCUMENTS

JP 2005-270558 A 10/2005
JP 2006-236172 A 9/2006
(Continued)

OTHER PUBLICATIONS

Japanese Office Communication for JP Application No. 2020-522612 dated Dec. 23, 2021 with English Translation.
(Continued)

Primary Examiner — Tai T Nguyen
(74) Attorney, Agent, or Firm — Sughrue Mion, PLLC

(57) ABSTRACT

An article management system according to the present invention includes: an acquisition unit that acquires article identification information, which is read from a storage medium provided to an article that passed through an article arrival port and identifies the article, by using a wireless communication device provided at the article arrival port of a shop; and a registration unit that registers the article information in a storage device so that whether or not an arrival state of the article in the shop is an arrived state and whether or not a display state of the article in the shop is a not-displayed state for the article corresponding to the article identification information acquired by the acquisition unit can be extracted from the storage device storing article (Continued)

information in which the article identification information, the arrival state, and the display state are associated with each other.

15 Claims, 23 Drawing Sheets

(51) Int. Cl.
*G06K 19/07* (2006.01)
*G06Q 10/08* (2012.01)
(58) Field of Classification Search
USPC .................................................. 340/572.1
See application file for complete search history.

(56) References Cited

U.S. PATENT DOCUMENTS

| | | | | |
|---|---|---|---|---|
| 6,774,782 | B2 * | 8/2004 | Runyon | ............. G08B 13/1427 |
| | | | | 340/505 |
| 7,245,221 | B2 * | 7/2007 | Claudatos | ............ G06Q 10/087 |
| | | | | 705/28 |
| 2008/0052198 | A1 | 2/2008 | Hosokawa | |
| 2009/0072948 | A1 | 3/2009 | Komaki et al. | |

FOREIGN PATENT DOCUMENTS

| | | | |
|---|---|---|---|
| JP | 2007-206745 | A | 8/2007 |
| JP | 2008-272012 | A | 11/2008 |
| JP | 2008-297086 | A | 12/2008 |
| JP | 2010-117919 | A | 5/2010 |
| JP | 2011-014161 | A | 1/2011 |
| JP | 2011-227778 | A | 11/2011 |
| JP | 2016-177744 | A | 10/2016 |
| JP | 2017-036123 | A | 2/2017 |

OTHER PUBLICATIONS

International Search Report for PCT Application No. PCT/JP2019/021647, dated Jul. 16, 2019.

* cited by examiner

FIG. 3

| PRODUCT CODE | PRODUCT NAME | UNIT PRICE (YEN) | PRODUCT CATEGORY | JAN CODE |
|---|---|---|---|---|
| 00012345 | [PRODUCT NAME_1] | 110 | B : BOX LUNCHES | [JAN CODE_1] |
| 00012346 | [PRODUCT NAME_2] | 110 | B : BOX LUNCHES | [JAN CODE_2] |
| ... | ... | ... | ... | ... |

FIG. 4

| PRODUCT CODE | PRODUCT ID | ARRIVAL STATE |
|---|---|---|
| 00034567 | E98956 | ARRIVED |
| 00034567 | E98957 | ARRIVED |
| ... | ... | ... |
| 00012345 | - | NOT IN STOCK |
| 00012346 | - | NOT IN STOCK |
| 00078901 | - | NOT IN STOCK |
| ... | ... | ... |

FIG. 5

| PRODUCT CODE | PRODUCT ID | DISPLAY STATE |
|---|---|---|
| 00012345 | A00001 | NOT-DISPLAYED |
| 00012345 | A00002 | NOT-DISPLAYED |
| ... | ... | ... |
| 00012345 | A00029 | NOT-DISPLAYED |
| 00012345 | A00030 | NOT-DISPLAYED |
| ... | ... | ... |

FIG. 6

| PRODUCT CODE | ORDER QUANTITY | ORDER DATE AND TIME |
|---|---|---|
| 00012345 | 30 | [ORDER DATE AND TIME_1] |
| 00012346 | 30 | [ORDER DATE AND TIME_1] |
| 00078901 | 15 | [ORDER DATE AND TIME_2] |
| ... | ... | ... |

FIG. 7

| SHELF ID | SHELF POSITION | TAG SHEET |
|---|---|---|
| T1 | T1-3-1 | SH-001 |
| T1 | T1-3-2 | SH-002 |
| T1 | T1-2-1 | SH-003 |
| ... | ... | ... |

FIG. 8

| SHELF LABEL ID | PRODUCT CODE |
|---|---|
| F-0001 | 00012345 |
| F-0002 | 00012346 |
| F-0003 | 00012347 |
| ... | ... |

FIG. 9

| PRODUCT CODE | SHELF POSITION | MINIMUM DISPLAY QUANTITY |
|---|---|---|
| 00012345 | T1-3-1 | 20 |
| 00012346 | T1-3-2 | 20 |
| ... | ... | ... |

FIG. 10

| PRODUCT CATEGORY | REMAINING PERIOD T (HOUR) | PRICE-CUT RATE (%) |
|---|---|---|
| B: BOX LUNCHES | $12 \leq T$ | 0 |
| B: BOX LUNCHES | $8 \leq T < 12$ | 25 |
| B: BOX LUNCHES | $5 \leq T < 8$ | 50 |
| ... | ... | ... |

FIG. 11

| PRODUCT CODE | PRODUCT ID | SALES DATE AND TIME |
|---|---|---|
| 00012345 | A00001 | [SALES DATE AND TIME_1] |
| 00012345 | A00002 | [SALES DATE AND TIME_2] |
| 00012345 | B00002 | [SALES DATE AND TIME_3] |
| ... | ... | ... |

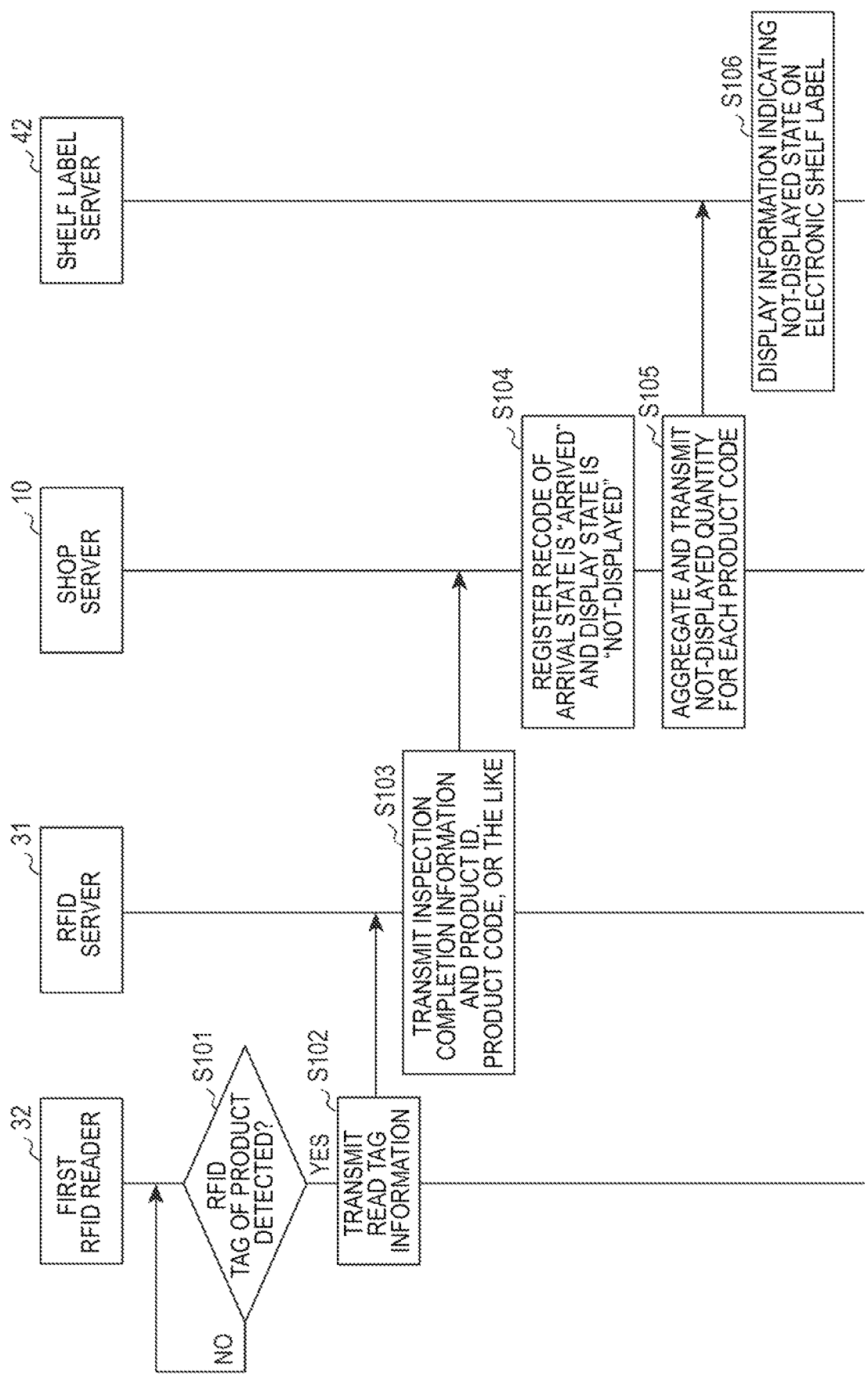

FIG. 15

| PRODUCT CODE | PRODUCT ID | ARRIVAL STATE |
|---|---|---|
| 00012345 | A00001 | ARRIVED |
| 00012345 | A00002 | ARRIVED |
| ... | ... | ... |
| 00012345 | A00029 | ARRIVED |
| 00012345 | A00030 | ARRIVED |
| ... | ... | ... |

| PRODUCT CODE | PRODUCT ID | DISPLAY STATE |
|---|---|---|
| 00012345 | A00001 | DISPLAYED |
| 00012345 | A00002 | DISPLAYED |
| ... | ... | ... |
| 00012345 | A00029 | DISPLAYED |
| 00012345 | A00030 | NOT-DISPLAYED |
| ... | ... | ... |

ARTICLE MANAGEMENT SYSTEM, ARTICLE MANAGEMENT APPARATUS, ARTICLE MANAGEMENT METHOD, AND STORAGE MEDIUM

This application is a National Stage Entry of PCT/JP2019/021647 filed on May 30, 2019, which claims priority from Japanese Patent Application 2018-105038 filed on May 31, 2018, the contents of all of which are incorporated herein by reference, in their entirety.

TECHNICAL FIELD

The present invention relates to an article management system, an article management apparatus, an article management method, and a storage medium.

BACKGROUND ART

Patent Literature 1 discloses an electronic shelf label system in which a product name, a price, a stock quantity, or the like of a product displayed on a display shelf are displayed on an electronic shelf label. A salesclerk and a customer can easily know the stock quantity of a target product by referencing the electronic shelf label.

CITATION LIST

Patent Literature

PTL 1: Japanese Patent Application Laid-open No. 2007-206745

SUMMARY OF INVENTION

Technical Problem

Since the electronic shelf label system disclosed in Patent Literature 1 as an example does not have a mechanism that associates an inspection operation and a displaying operation for a product that newly arrived in the shop with each other, a salesclerk may not efficiently perform article management in the shop.

Accordingly, in view of the above problem, the present invention intends to provide an article management system, an article management apparatus, an article management method, and a storage medium that enable a salesclerk to efficiently perform an operation when performing article management in a shop.

Solution to Problem

According to one example aspect of the present invention, provided is an article management system including: An article management system comprising: an acquisition unit that acquires article identification information, which is read from a storage medium provided to an article that passed through an article arrival port and identifies the article, by using a wireless communication device provided at the article arrival port of a shop; and a registration unit that registers article information in a storage device so that whether or not an arrival state of the article in the shop is an arrived state and whether or not a display state of the article in the shop is a not-displayed state for the article corresponding to the article identification information acquired by the acquisition unit are extracted from the storage device storing the article information in which the article identification information, the arrival state, and the display state are associated with each other.

According to another example aspect of the present invention, provided is an article management system including; a display detection unit that acquires article identification information, which is read from a storage medium provided to an article and identifies the article and detects a display state of the article in a fixture, by using a wireless communication device provided to the fixture in a shop; a determination unit that, based on article information in which the article identification information, the display state, and fixture information related to the fixture where the article is to be displayed are associated with each other and based on the article identification information acquired by the display detection unit, determines whether or not the article identification information on the article for which the display state was a not-displayed state is acquired by the display detection unit; and an output unit that outputs information indicating that the article is in a displayed state when the article identification information on the article that was in the not-displayed state is acquired by the display detection unit.

According to yet another example aspect of the present invention, provided is an article management apparatus including; an acquisition unit that acquires article identification information, which is read from a storage medium provided to an article that passed through an article arrival port and identifies the article, by using a wireless communication device provided at the article arrival port of a shop; and a registration unit that registers article information in a storage device so that whether or not an arrival state of the article in the shop is an arrived state and whether or not a display state of the article in the shop is a not-displayed state for the article corresponding to the article identification information acquired by the acquisition unit are extracted from the storage device storing the article information in which the article identification information, the arrival state, and the display state are associated with each other.

According to yet another example aspect of the present invention, provided is an article management method including: acquiring article identification information, which is read from a storage medium provided to an article that passed through an article arrival port and identifies the article, by using a wireless communication device provided at the article arrival port of a shop; and registering article information in a storage device so that whether or not an arrival state of the article in the shop is an arrived state and whether or not a display state of the article in the shop is a not-displayed state for the article corresponding to the acquired article identification information are extracted from the storage device storing the article information in which the article identification information, the arrival state, and the display state are associated with each other.

According to yet another example aspect of the present invention, provided is a storage medium stored a program that causes a computer to perform: acquiring article identification information, which is read from a storage medium provided to an article that passed through an article arrival port and identifies the article, by using a wireless communication device provided at the article arrival port of a shop; and registering article information in a storage device so that whether or not an arrival state of the article in the shop is an arrived state and whether or not a display state of the article in the shop is a not-displayed state for the article corresponding to the acquired article identification information are extracted from the storage device storing the article information in which the article identification information, the arrival state, and the display state are associated with each other.

Advantageous Effects of Invention

According to the present invention, an article management system, an article management apparatus, an article management method, and a storage medium that enable a salesclerk to efficiently perform an operation when performing article management in a shop can be provided.

BRIEF DESCRIPTION OF DRAWINGS

FIG. 3 is a diagram illustrating an example of information stored in a product information table according to the first example embodiment.

FIG. 4 is a diagram illustrating an example of information stored in an arrival information table according to the first example embodiment.

FIG. 5 is a diagram illustrating an example of information stored in a display information table according to the first example embodiment.

FIG. 6 is a diagram illustrating an example of information stored in an order information table according to the first example embodiment.

FIG. 7 is a diagram illustrating an example of information stored in a display shelf management table according to the first example embodiment.

FIG. 8 is a diagram illustrating an example of information stored in an electronic shelf label management table according to the first example embodiment.

FIG. 9 is a diagram illustrating an example of information stored in a display condition table according to the first example embodiment.

FIG. 10 is a diagram illustrating an example of information stored in a price-cut condition table according to the first example embodiment.

FIG. 11 is a diagram illustrating an example of information stored in a sales achievement table according to the first example embodiment.

FIG. 13 is a sequence diagram illustrating an example of an inspection process performed in the article management system according to the first example embodiment.

FIG. 15 is a diagram illustrating an example of information stored in an arrival information table according to the first example embodiment.

DESCRIPTION OF EMBODIMENTS

Figure 1:
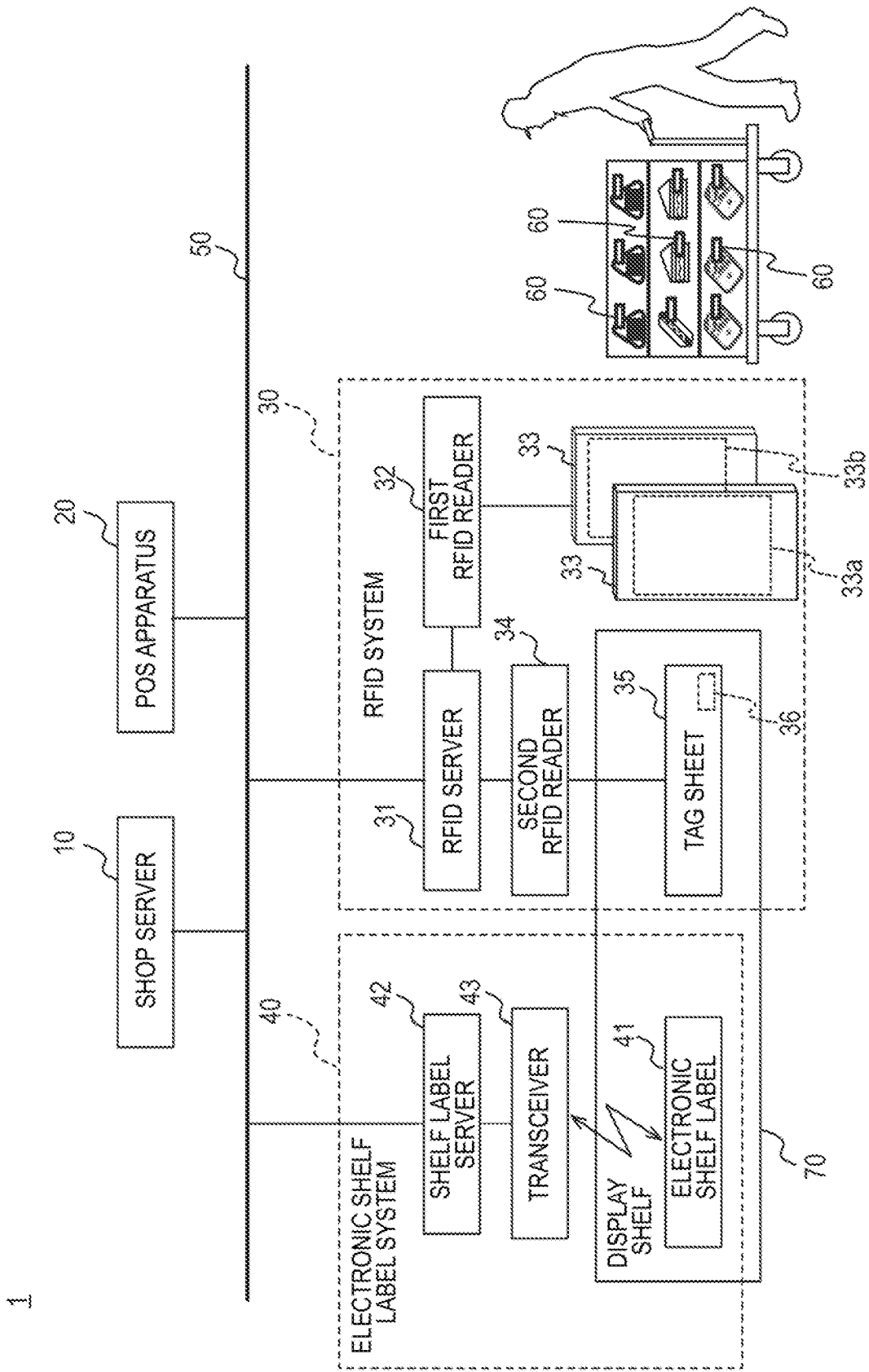
FIG. 1 is a block diagram illustrating an example of an overall configuration of an article management system according to a first example embodiment.

Exemplary example embodiments of the present invention will be described below with reference to the drawings. In the drawings, the same components or corresponding components are labeled with the same references, and the description thereof may be omitted or simplified.

First Example Embodiment

The configuration of an article management system 1 according to the present example embodiment will be described with reference to FIG. 1 to FIG. 12. FIG. 1 is a block diagram illustrating an example of the overall configuration of an article management system 1. The article management system 1 is a computer system that manages an article in a facility such as a shop and has a shop server 10, a point of sales (POS) apparatus 20, a radio frequency identifier (RFID) system 30, and an electronic shelf label system 40.

The shop server 10, the POS apparatus 20, the RFID system 30, and the electronic shelf label system 40 are connected to each other via a network 50 such as a local area network (LAN). In the present example embodiment, a case where the article management system 1 is provided in a shop such as a convenience store and an article to be managed is a product that is sold in the shop will be described.

The shop server 10 is a computer that manages various information (hereinafter, collectively referred to as "article information") used for article management such as product detailed information, stock information, order information, display information, or sales achievement of a product sold in the shop. The shop server 10 is provided in a backyard of the shop, for example.

The POS apparatus 20 is provided at each register counter in the shop and performs a checkout process. The number of POS apparatuses 20 is not particularly limited, and any number thereof can be installed in accordance with the size of the shop or the like. Further, a peripheral device (not illustrated) such as a code scanner, a contactless integrated circuit (IC) reader/writer, a printer, or a cash drawer is connected to the POS apparatus 20, for example. The POS apparatus 20 performs a checkout process by controlling the peripheral device. The POS apparatus 20 forms a POS system together with the shop server 10 and an ordering terminal (not illustrated). That is, the shop server 10 has a function as a POS server that performs management of a product sold in the shop, aggregation of sales data, management of sales, management of stock, management of ordering of a product, or the like.

The RFID system 30 is a computer system having an RFID server 31, a first RFID reader 32, gates 33, a second RFID reader 34, and a tag sheet 35. The RFID server 31 is a computer that controls and causes the first RFID reader 32 and the second RFID reader 34 to perform a process of reading tag information of an RFID tag 60 provided to each product. The RFID server 31 is connected to the shop server 10 via the network 50 and transmits and receives data such as tag information or a command to and from the shop server 10.

The RFID tag 60 has a tag antenna (not illustrated) and a tag IC (not illustrated) that wirelessly communicates with reader antennas 33a, 33b, and 36 described later via the tag antenna. The tag information stored in the tag IC may be a product code (a product identification code), a lot number, a serial number, a manufacturing date, a use-by date (quality maintenance period), a country of origin, or the like. As data included in the tag information and the data format, it is preferable to use a GS1 application identifier (AI) standardized by GS1 because data cooperation between companies is facilitated.

The first RFID reader 32 is a reading device for the RFID tag 60 by using a wireless communication technique (a wireless communication device). Specifically, at the gate 33, the first RFID reader 32 transmits a radio wave from the reader antennas 33a and 33b described later at predetermined time intervals (for example, 1 second interval) to supply electric power to the RFID tag 60 that receives the radio wave. The RFID tag 60 of the present example embodiment is a passive-type IC tag. Further, when the first RFID reader 32 receives a wireless signal transmitted by the RFID tag 60 via the reader antennas 33a and 33b, the first RFID reader 32 retrieves tag information from the received wireless signal. The first RFID reader 32 then transmits the retrieved tag information to the RFID server 31.

The gate 33 is provided at the arrival port of a product (the article arrival port) in the shop and is a device that detects the RFID tag 60 by using the built-in reader antennas 33a and 33b. A sufficiently large space is provided between the gates 33 so that a carriage used for carrying in and out a product or the like can pass through.

The second RFID reader 34 is a reading device of the RFID tag 60 (a wireless communication device) having the same function as the first RFID reader 32 described above. Further, the second RFID reader 34 is different from the first RFID reader 32 in that the tag information is read from the RFID tag 60 of a product displayed on a display shelf 70 via the reader antenna 36 described later.

The tag sheet 35 is a sheet-like member formed in a shape and a size in accordance with a display region of a product. The tag sheet 35 has the reader antenna 36 used by the second RFID reader 34 to transmit and receive a radio wave to and from the RFID tag 60. When a product is displayed on the tag sheet 35, the second RFID reader 34 can read tag information with the RFID tag 60 of the product and the reader antenna 36. Contrarily, when a product is taken from the display shelf 70, the second RFID reader 34 is unable to read the tag information on the product on the tag sheet 35. That is, the reading state of the tag information in the tag sheet 35 indicates a display state of the product.

The electronic shelf label system 40 is a computer system having an electronic shelf label 41, a shelf label server 42, and a transceiver 43. The electronic shelf label 41 is provided for each product in the display shelf 70 in the shop and is an electronic display device that arbitrarily displays information such as a product name or a price of each product. Note that, in the present example embodiment, the term "display shelf" is used as a meaning including various fixtures that does not have a shelf shape.

The shelf label server 42 is a computer that performs display control of the electronic shelf label 41 via the transceiver 43 that is a wireless communication device. The shelf label server 42 is connected to the shop server 10 via the network 50 and transmits and receives data such as a product name, a price, display instruction information, or error information regarding a product to and from the shop server 10.

Figure 2:
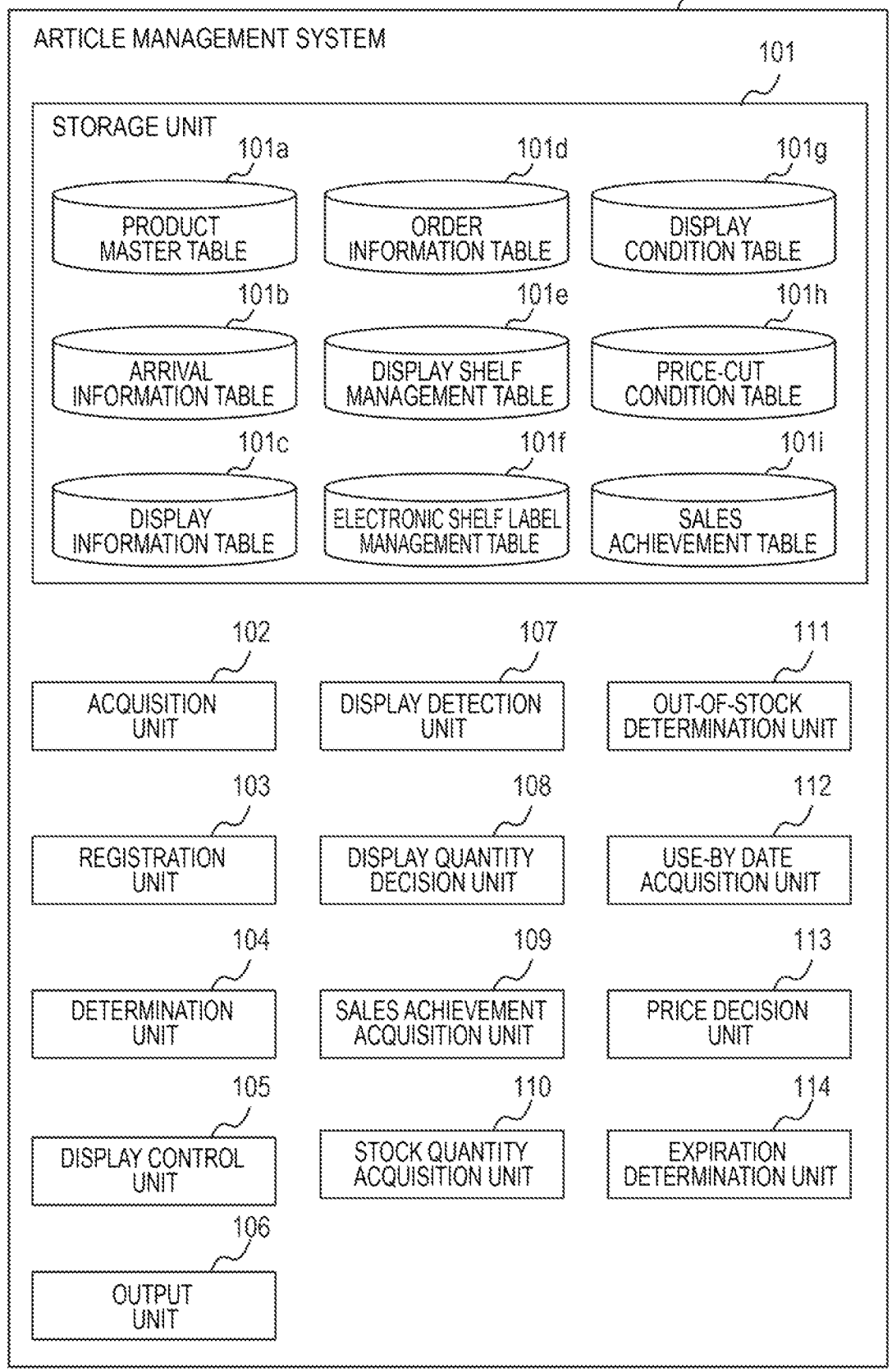
FIG. 2 is a function block diagram of the article management system according to the first example embodiment.

FIG. 2 is a function block diagram of the article management system 1 according to the present example embodiment. As illustrated in FIG. 2, the article management system 1 has a storage unit 101, an acquisition unit 102, a registration unit 103, a determination unit 104, a display control unit 105, an output unit 106, a display detection unit 107, a display quantity decision unit 108, a sales achievement acquisition unit 109, a stock quantity acquisition unit 110, an out-of-stock determination unit 111, a use-by date acquisition unit 112, a price decision unit 113, and an expiration determination unit 114. While each unit is mainly implemented as a function of the shop server 10, the present example embodiment is not limited thereto. A part of the function may be implemented to the RFID server 31 or the shelf label server 42. Similarly, the information stored by the shop server 10 as the storage unit 101 may be stored on the RFID server 31 side or the shelf label server 42 side.

The storage unit 101 is a database (a storage device) that stores article information in which article identification information (a product ID) that identifies an article (a product), an arrival state of an article to the shop, and an article display state in the shop are associated with each other. Further, the storage unit 101 also stores a fixture information related to the fixture (a display shelf 70) where the article is to be displayed and the minimum displayed quantity of articles in the fixture in association with article identification information, an arrival state, and a display state. Details of information stored in the storage unit 101 will be described later.

The acquisition unit 102 acquires article identification information read from a storage medium (the RFID tag 60) provided to the article that has passed through an article arrival port by using a wireless communication device (the first RFID reader 32 and the gate 33) provided at the article arrival port of the shop. The article identification information is included in the tag information on the RFID tag 60. In the present example embodiment, a function of the acquisition unit 102 is implemented by a CPU of the RFID server 31.

The registration unit 103 registers article information in the storage unit 101 for an article corresponding to article identification information acquired by the acquisition unit 102 so that whether or not the arrival state of the article in the shop is an arrived state and whether or not the display state of the article in the shop is a not-displayed state can be extracted from the storage unit 101.

The determination unit 104 determines whether or not there is an article whose arrival state is an arrived state and whose display state is a not-displayed state based on the article information extracted from the storage unit 101. Further, the determination unit 104 determines whether or not the article identification information on the article whose display state was a not-displayed state is acquired by the display detection unit 107 based on the article information and the article identification information acquired by the display detection unit 107.

When there is an article whose arrival state is an arrived state and whose display state is a not-displayed state, the display control unit 105 controls a display device (the electronic shelf label 41) to display information indicating that the article is in a not-displayed state in a display device (the electronic shelf label 41) provided to the fixture (the display shelf 70) where the article is to be displayed. In the present example embodiment, the function of the display control unit 105 is implemented by a CPU of the shelf label server 42 based on an instruction from the shop server 10.

The output unit 106 outputs information based on a determination result obtained by the determination unit 104. Specifically, the determination unit 104 determines whether or not the article identification information on the article whose display state was in a not-displayed state is acquired by the display detection unit 107 based on the article information further associated with fixture information related to the fixture where the article is to be displayed and based on the article identification information acquired by the display detection unit 107. Further, when the article identification information on the article that was in a not-displayed state is acquired by the display detection unit 107, the output unit 106 outputs information indicating that the article is in a displayed state.

The display detection unit 107 acquires article identification information read from a storage medium (the RFID tag 60) provided to the article by using a wireless communication device (the second RFID reader 34 and the tag sheet 35) provided to the fixture and detects the article display state in the fixture.

The display quantity decision unit 108 decides the display article quantity in the fixture based on a not-displayed quantity related to the article that is in a not-displayed state, the fixture information, and the minimum display quantity for each article identification information in the fixture.

The sales achievement acquisition unit 109 acquires sales achievement of an article from the POS apparatus 20 provided in the shop. When the plurality of POS apparatuses 20 are present in the shop, the sales achievement of the article is aggregated from the POS apparatuses 20 to the shop server 10 and acquired from the shop server 10. When sales achievement is acquired for an article that was in a not-displayed state, the above display quantity decision unit 108 decides a display quantity of the article in the fixture by subtracting the sales quantity related to the sales achievement from the not-displayed quantity related to the article that is in a not-displayed state.

The stock quantity acquisition unit 110 acquires an in-shop stock quantity obtained by aggregating the article quantity in the not-displayed state and acquires a displayed stock quantity obtained by aggregating the article quantity in the displayed state detected in the fixture (the display shelf 70) by the display detection unit 107.

The out-of-stock determination unit 111 determines an out-of-stock state of an article in the fixture based on an in-shop stock quantity and a displayed stock quantity. When an article is in an out-of-stock state, the display control unit 105 displays out-of-stock information on the display device (electronic shelf label 41). Note that the out-of-stock state in the present example embodiment includes the following three states, and each state can be appropriately displayed on the electronic shelf label 41.

Out-of-stock state (1): The product is not displayed on the display shelf 70 (displayed stock quantity=0), and there is no stock of the same product in the shop (in-shop stock quantity=0).

Out-of-stock state (2): The product is not displayed on the display shelf 70 (displayed stock quantity=0), and there is a stock of the same product in the shop (in-shop stock quantity $\geq 1$).

Out-of-stock state (3): The product is displayed on the display shelf 70 (displayed stock quantity $\geq 1$), and the displayed stock quantity is smaller than the minimum displayed quantity.

The use-by date acquisition unit 112 acquires a use-by date of an article from a storage medium (the RFID tag 60). The price decision unit 113 decides a sales price of an article based on a use-by date acquired in the use-by date acquisition unit 112 and the current date and time. The display control unit 105 displays a sales price decided in the price decision unit 113 on a display device (the electronic shelf label 41).

The expiration determination unit 114 determines whether or not the current date and time exceeds the use-by date of an article based on the use-by date acquired by the use-by date acquisition unit 112. Further, the display control unit 105 displays information indicating that the use-by date expired on the display device (the electronic shelf label 41) for the article that exceeded the use-by date.

Next, information stored in a table included in the storage unit 101 as illustrated in FIG. 2 will be described with reference to FIG. 3 to FIG. 11. Note that the type of the table, the data item of each table, and the data are only an example and are not limited to the information illustrated in the drawings.

FIG. 3 is a diagram illustrating an example of information stored in a product master table 101a. The product master table 101a uses a product code, a product name, a unit price, a product category, and a JAN code as data items. The product code is identification information that identifies a product. For example, the product codes are different for "egg sandwich" and "salmon onigiri". The product category indicates rough classification of products, such as "drink", "snacks", "box lunches", "stationary", or "book". Note that, although the product code and the JAN code are provided separately in FIG. 3, the JAN code may be employed as the product code.

FIG. 4 is a diagram illustrating an example of information stored in an arrival information table 101b. The arrival information table 101b uses a product code, a product ID, and an arrival state as data items. The product ID is identification information (article identification information) that is unique to each product and is different from the above product code. That is, when products are "salmon onigiri", the product codes are common, but the product IDs are different between individual products. As the product ID, a serial number allocated by a manufacturer of the product and stored in the RFID tag 60 in advance may be used, for example. By using the product ID, it is possible to manage individual products. Note that, in the present example embodiment, either "not in stock" or "arrived" is set in the arrival state. Note that, as data indicating "not in stock", a blank field or a value such as NULL may be used.

FIG. 5 is a diagram illustrating an example of information stored in a display information table 101c. The display information table 101c uses a product code, a product ID, and a display state as data items. In the display information table 101c in the present example embodiment, a case where the corresponding product ID record is registered when a record is registered in the above arrival information table 101b is illustrated. Further, either "not-displayed" or "displayed" is set to the display state. Note that, as data indicating "not-displayed", a blank field or a value such as NULL may be used.

FIG. 6 is a diagram illustrating an example of information stored in an order information table 101d. The order information table 101d uses a product code, an order quantity, an order date and time as data items. For example, the order quantity of a product whose product code is "00012345" is "30", and the order date and time is "[order date and time_1]".

FIG. 7 is a diagram illustrating an example of information stored in a display shelf management table 101e. The display shelf management table 101e uses a shelf ID, a shelf position, and a tag sheet ID as data items. The shelf ID is identification information that identifies the display shelf 70. The shelf position is information that identifies the position in the display shelf 70. In this example, the data of the shelf position is represented in a data format in which (display shelf ID), (stage number in the display shelf 70), and (column number in the display shelf 70) are connected with a symbol "-". Further, the tag sheet ID is identification information that identifies the tag sheet 35 provided in a region identified by the shelf ID and the shelf position. For example, at a position identified by the shelf ID "T1" and the shelf position "T1-3-1", the tag sheet 35 whose tag sheet ID is "SH-001" is provided.

FIG. 8 is a diagram illustrating an example of information stored in an electronic shelf label management table 101f. The electronic shelf label management table 101f uses a shelf label ID and a product code as data items. The shelf label ID is identification information that identifies the electronic shelf label 41. That is, the electronic shelf label management table 101f defines a correspondence relationship between the electronic shelf label 41 and the product code of the product whose information is displayed on the electronic shelf label 41.

FIG. 9 is a diagram illustrating an example of information stored in a display condition table 101g. The display condition table 101g uses a product code, a shelf position, and the minimum display quantity as data items. For example, it is represented that at least 20 products whose product code is "00012345" are required to be displayed at the shelf position "T1-3-1". That is, when the display quantity of the product is less than 20, product replenishment instruction information is notified. Note that the minimum display quantity may be defined in accordance with a time zone, a day of week, or the like. Details of the replenishment instruction information will be described later.

FIG. 10 is a diagram illustrating an example of information stored in a price-cut condition table 101h. The price-cut condition table 101h uses a product category, a remaining period T (hour), and a price-cut rate (%) as data items. The remaining period T indicates a period from the current date and time to a use-by date of a product (expiration date). For example, when the remaining period is 9 hours for products of the product category "B: box lunches", a condition in the second record is applied. That is, a price that is 25% lower than the normal price is set for the product. Note that, when the remaining period is 0 or a negative value, the displayed product may be a disposal/removal target. However, a disposal/removal condition may not be defined together with the price-cut condition. Details of determination processes of the price-cut and the disposal/removal will be described later.

FIG. 11 is a diagram illustrating an example of information stored in a sales achievement table 101i. The sales achievement table 101i uses a product code, a product ID, and a sales date and time as data items. For example, it is represented that a product whose product code is "00012345" and whose product ID is "A00001" was sold at the sales date and time "[sales date and time_1]"

Figure 12:
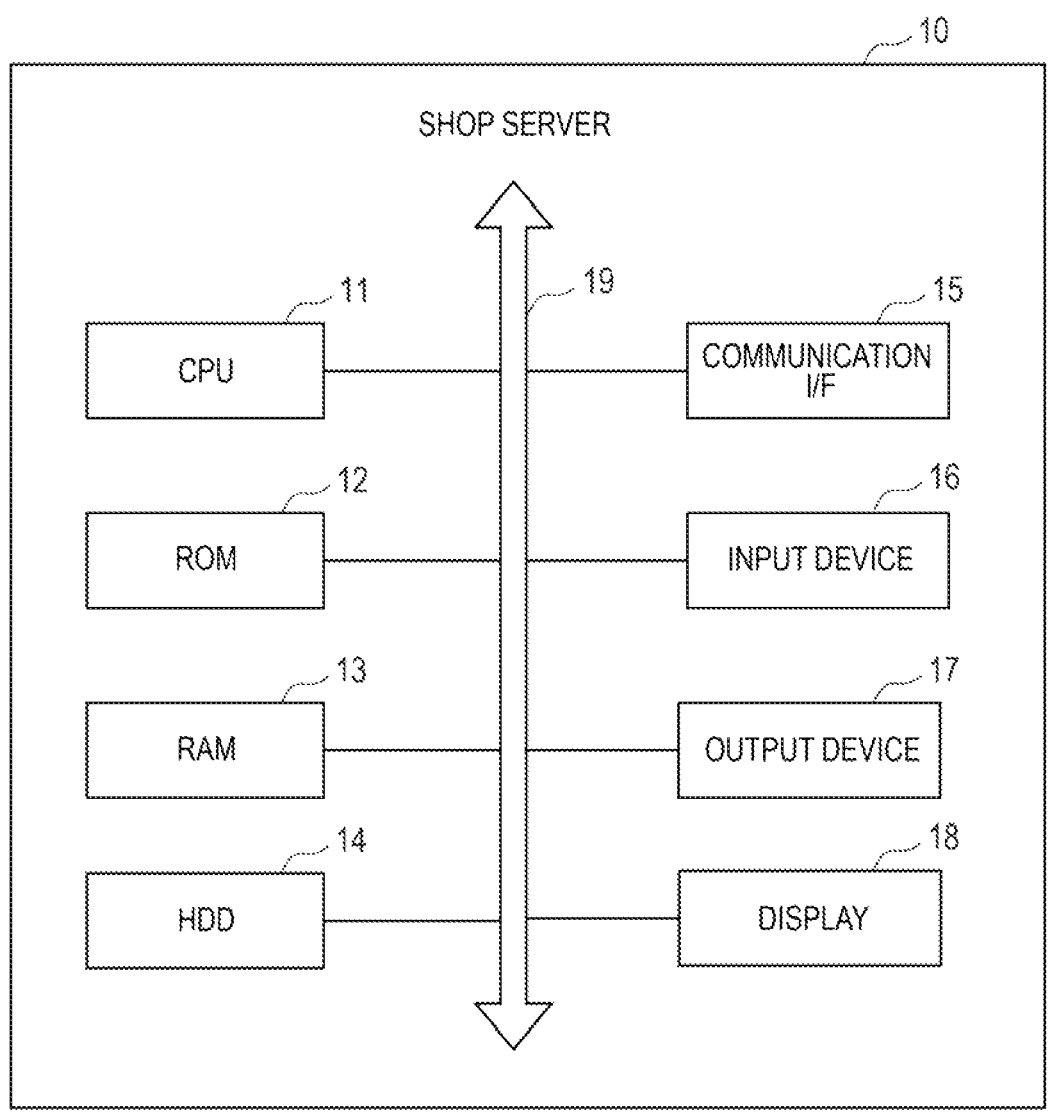
FIG. 12 is a block diagram illustrating an example of a hardware configuration of a shop server according to the first example embodiment.

FIG. 12 is a block diagram illustrating a hardware configuration example of the shop server 10. Since the RFID server 31 and the shelf label server 42 have the same hardware configuration as the shop server 10, the shop server 10 will be described as an example below.

As illustrated in FIG. 12, the shop server 10 has a central processing unit (CPU) 11, a read only memory (ROM) 12, a random access memory (RAM) 13, a hard disk drive (HDD) 14, a communication interface (I/F) 15, an input device 16, an output device 17, and a display 18. Each device is connected to a common bus line 19.

The CPU 11 controls the overall operation of the shop server 10. Further, the CPU 11 loads a program stored in the HDD 14 or the like to the RAM 13 and executes the program. In such a way, the CPU 11 implements functions as the acquisition unit 102, the registration unit 103, the determination unit 104, the display control unit 105, the output unit 106, the display detection unit 107, the display quantity decision unit 108, the sales achievement acquisition unit 109, the stock quantity acquisition unit 110, the out-of-stock determination unit 111, the use-by date acquisition unit 112, the price decision unit 113, and the expiration determination unit 114 described above. The ROM 12 stores a program such as a boot program. The RAM 13 is used as a working area when the CPU 11 executes a program.

Further, the HDD 14 is a storage device that stores a process result obtained in the shop server 10 and various programs executed by the CPU 11. The storage device is not limited to the HDD 14 as long as it is nonvolatile. For example, the storage device may be a flash memory or the like. The HDD 14 implements a function as the storage unit 101 described above.

The communication I/F 15 controls data communication with a device connected to the network 50. The communication I/F 15, together with the CPU 11, implements functions as the acquisition unit 102, the registration unit 103, the determination unit 104, the display control unit 105, the output unit 106, the display detection unit 107, the display quantity decision unit 108, the sales achievement acquisition unit 109, the stock quantity acquisition unit 110, the out-of-stock determination unit 111, the use-by date acquisition unit 112, the price decision unit 113, and the expiration determination unit 114 described above.

For example, the input device 16 is a keyboard, a pointing device, or the like and is used by a user for operating the shop server 10. An example of the pointing device may be a mouse, a trackball, a touch panel, a pen tablet, or the like. Further, the input device 16 may be a touch panel embedded in the display 18. The user of the shop server 10 may input a setting of the shop server 10, input an execution instruction of a process, or the like via the input device 16.

The output device 17 is a device that outputs predetermined information in accordance with a control signal from the CPU 11. For example, the output device 17 may be a speaker, a printer, or the like.

The display 18 is a device that displays predetermined information in accordance with a control signal from the CPU 11. For example, the display 18 may be a liquid crystal display, an OLED display, or the like and is used for displaying an image, a text, an interface, or the like.

Note that the hardware configuration illustrated in FIG. 12 is an example, and a device other than the above may be added, or some of the devices may not be provided. Further, some of the devices may be replaced with another device having the same function. Furthermore, some of the functions of the present example embodiment may be provided by another device via the network 50. Furthermore, the function of the present example embodiment may be implemented by being distributed in a plurality of devices. For example, the HDD 14 may be replaced with a solid state drive (SSD) using a semiconductor memory or may be replaced with cloud storage.

[Inspection Process at Arrival]

Next, an operation associated with arrival of a product of the article management system 1 will be described with reference to FIG. 13 to FIG. 15.

FIG. 13 is a sequence diagram illustrating an example of an inspection process performed in the article management system 1.

In S101, the first RFID reader 32 determines whether or not the RFID tag 60 provided to a product that has passed between the gates 33 provided at an arrival port is detected. If the first RFID reader 32 determines here that the RFID tag 60 is detected (S101: YES), the process proceeds to S102. On the other hand, if the first RFID reader 32 determines that the RFID tag 60 is not detected (S101: NO), the process of S101 is repeated.

In S102, the first RFID reader 32 transmits the tag information read from the RFID tag 60 to the RFID server 31.

In S103, the RFID server 31 transmits inspection complete information and a product code, the product ID, or the like included in the tag information to the shop server 10.

In S104, the shop server 10 registers a record in which the arrival state is "arrived" in the arrival information table 101*b* for the product ID of the detected product. Further, the shop server 10 registers a record in which the display state is "not-displayed" in the display information table 101*c* for the same product ID.

In S105, the shop server 10 aggregates and transmits a not-displayed quantity for each product code to the shelf label server 42. In S106, the shelf label server 42 displays information indicating a not-displayed state on the electronic shelf label 41.

Figure 14A:
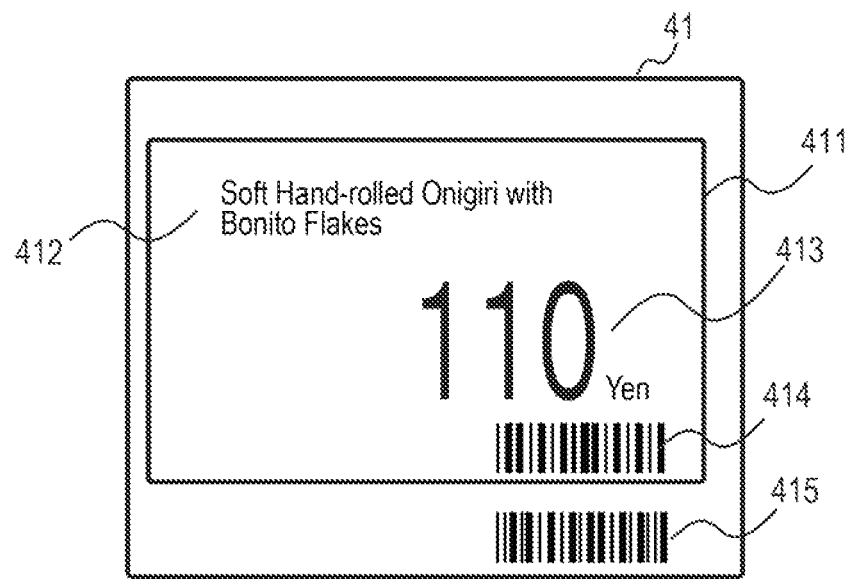
FIG. 14A is a diagram illustrating a relationship between display information on the electronic shelf label and an arrival/inspection operation according to the first example embodiment.
Figure 14B:
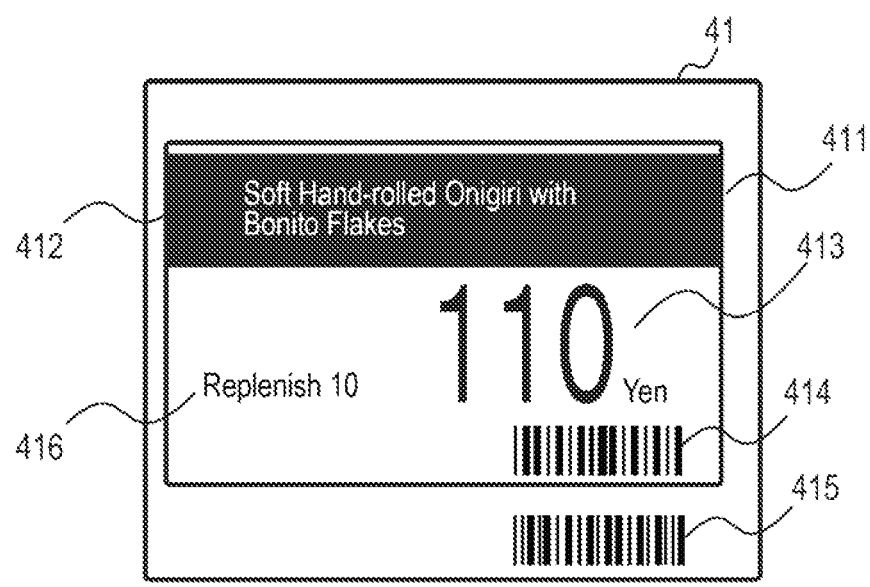
FIG. 14B is a diagram illustrating a relationship between display information on the electronic shelf label and an arrival/inspection operation according to the first example embodiment.

FIG. 14A and FIG. 14B are diagrams illustrating a relationship between display information on the electronic shelf label 41 and an arrival/inspection operation. FIG. 14A illustrates display information on the electronic shelf label 41 before the ordered product arrived in the shop. The electronic shelf label 41 has a display portion 411 at the center region. A display field 412 of a product name is provided in the upper part of the display portion 411, a display field 413 of a price is provided in the right side in the center part of the display portion 411, and a display field 414 of a bar code corresponding to the product code is provided in the lower right part of the display portion 411. Further, a bar code corresponding to the shelf label ID is printed on the lower right region 415 of the electronic shelf label 41.

On the other hand, FIG. 14B illustrates display information on the electronic shelf label 41 after the product arrived in the shop and the inspection is completed. In FIG. 14B, unlike FIG. 14A, the background color of the display field 412 of the produce name is changed. The display state of the display field 412 of the product name indicates that a not-displayed product that is a target of a displaying operation is present. Further, a message ("replenish 10") indicating the number of products to be displayed is displayed on the left side field 416 of the display field 413 of the price. In such a way, when products pass through the gates 33 and thereby all the products are collectively inspected, the display instruction information is displayed on the electronic shelf label 41 corresponding to each product. Note that information indicating that a not-displayed product is present may be represented in a form other than a form to change the background color of the display field 412 of a product name as described above. For example, the text in the display field 412 of a product name may be blinked, or a text message or the like may be displayed on another region of another display portion 411.

FIG. 15 is a diagram illustrating an example of information stored in an arrival information table 101*b*. FIG. 15 is different from FIG. 4 and illustrates information after the product whose product code is "00012345" arrived. In FIG. 4, the product ID associated with the product code "00012345" is "-", and the arrival state was "not in stock". On the other hand, in FIG. 15, a plurality of product IDs associated with the product code "00012345" are present, and the arrival state is registered as "arrived". That is, the number of records of the product code "00012345" was one before arrival. After arrival, however, the record of the product code "00012345" before arrival is deleted. Instead, the same number of records (product ID: A00001 to A00030) as the ordered quantity is registered. The plurality of product IDs are acquired from the RFID tag 60 of each product that has arrived. Note that the record registration method described above is an example and is not limited to this method. For example, a record including a product code and a product ID read from the RFID tag 60 may be registered in response to completion of inspection instead of the record being registered in the arrival information table 101b in response to completion of order placement.

[Display Control at Displaying Operation]

Figure 16:
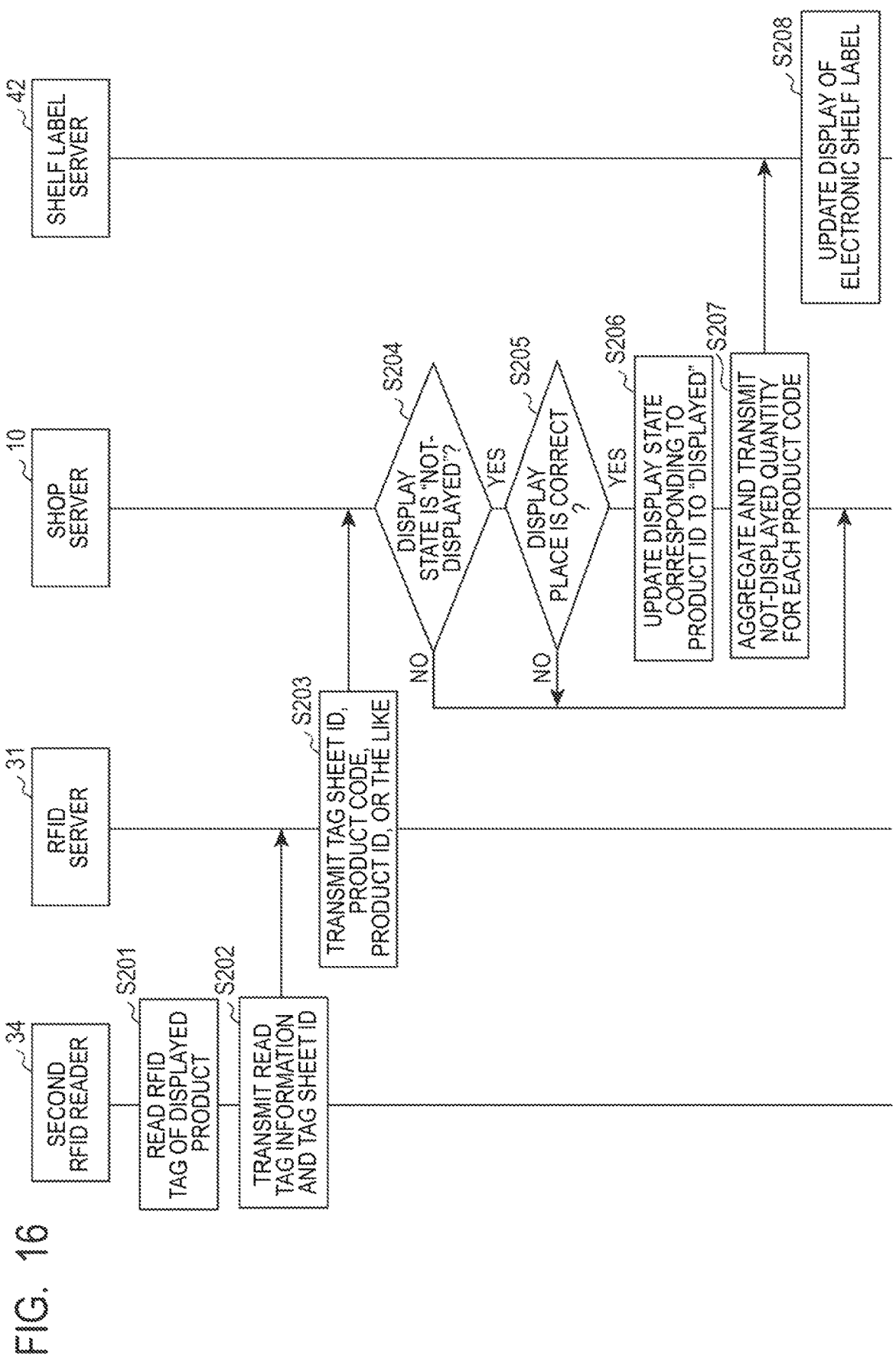
FIG. 16 is a sequence diagram illustrating an example of a display control process of the electronic shelf label performed in the article management system according to the first example embodiment.

Next, an operation performed in the article management system 1 during the displaying operation will be described with reference to FIG. 16 to FIG. 23. FIG. 16 is a sequence diagram illustrating an example of a display control process of the electronic shelf label 41 performed in the article management system 1.

In S201, the second RFID reader 34 reads tag information from the RFID tag 60 of a displayed product. In S202, the second RFID reader 34 transmits the read tag information and the tag sheet ID to the RFID server 31.

In S203, the RFID server 31 transmits the received tag sheet ID, a product ID, and a product code to the shop server 10.

In S204, the shop server 10 references the display information table 101c based on the received product ID and determines whether or not the display state of the product ID is "not-displayed". If the shop server 10 determines here that the display state of the product ID is "not-displayed" (S204: YES), the process proceeds to S205. On the other hand, if the shop server 10 determines that the display state of the product ID is not "not-displayed" but "displayed" (S204: NO), the process ends.

In S205, the shop server 10 references the display shelf management table 101e and the display condition table 101g based on the received product code and the tag sheet ID and determines whether or not the place where the product is displayed is correct. If the shop server 10 determines here that the place where the product is displayed is correct (S205: YES), the process proceeds to S206. On the other hand, if the shop server 10 determines that the place where the product is displayed is not correct (S205: NO), the process ends. That is, the display instruction information remains displayed on the electronic shelf label 41.

In S206, the shop server 10 updates the display state corresponding to the product ID to "displayed" in the display information table 101c.

In S207, the shop server 10 references the display information table 101c and aggregates and transmits the not-displayed quantity for each product code to the shelf label server 42.

In S208, the shelf label server 42 updates the display of the electronic shelf label 41 based on the not-displayed quantity for each product code received from the shop server 10.

Figures 17, 18:
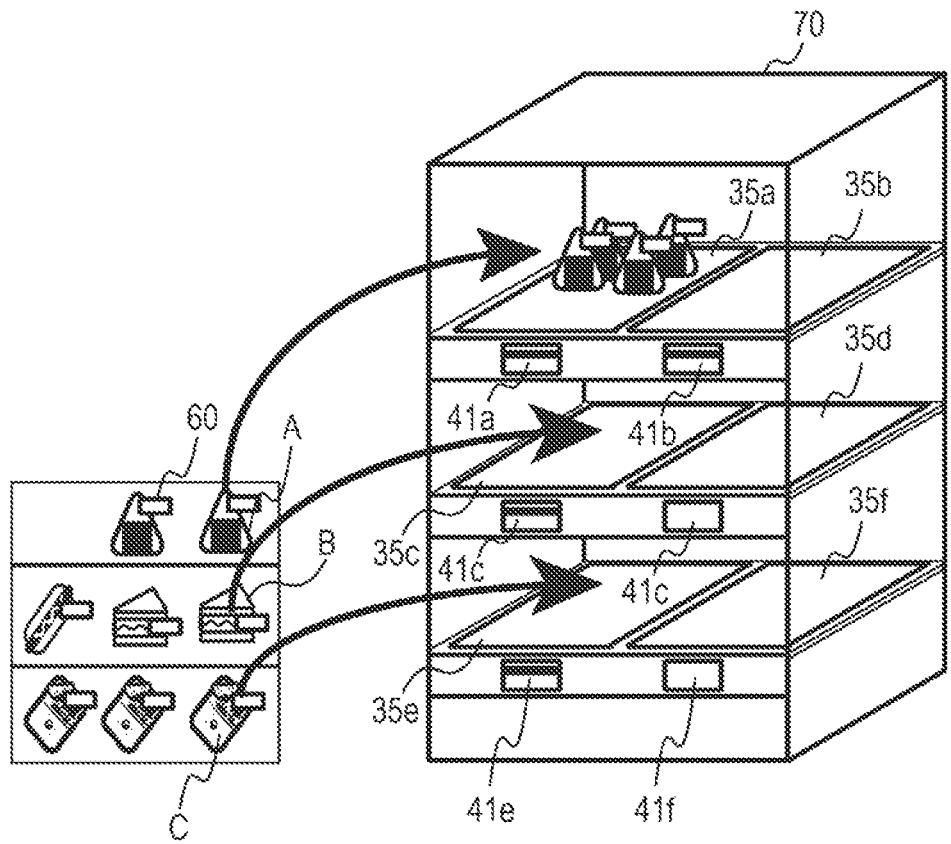
FIG. 17 is a diagram illustrating a displaying operation according to the first example embodiment.
FIG. 18 is a diagram illustrating an example of information stored in a display information table according to the first example embodiment.

FIG. 17 is a diagram illustrating a displaying operation. The display shelf 70 illustrated in FIG. 17 has three stages and two columns and therefore has six display areas. Further, tag sheets 35 (35a to 35f) are provided in respective display areas. A salesclerk displays the inspected product at a predetermined position of the display shelf 70 based on information displayed on the electronic shelf label 41. For example, the product A (onigiri) is displayed in a position that is the third stage from the bottom (the top stage) and the first column from the left of the display shelf 70. Similarly, the product B (sandwich) is displayed in a position that is the second stage from the bottom (the middle stage) and the first column from the left of the display shelf 70. Therefore, the product C (box lunch) is displayed at a position that is the first stage (the lowest stage) and the first column from the left of the display shelf 70.

FIG. 18 is a diagram illustrating an example of information stored in a display information table 101c. In FIG. 18, unlike FIG. 5 described above, the display states are updated to "displayed" for the products whose product IDs are A00001 to A00029. Such data update is performed in response to a displaying operation of the product as a trigger. Note that, for a product whose product ID is "A00030", it is represented that the display state is "not-displayed", and the displaying operation is not completed.

Figure 19A:
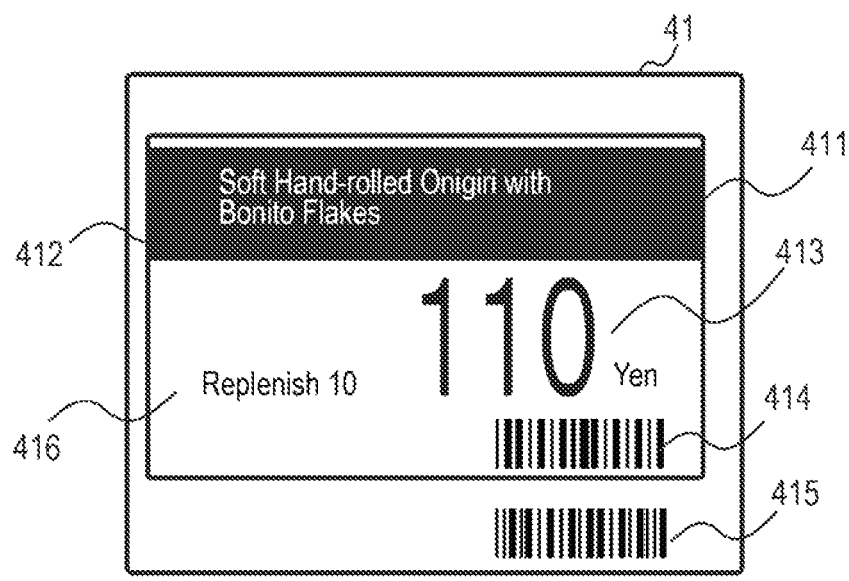
FIG. 19A is a diagram illustrating a relationship between display information on the electronic shelf label and a displaying operation according to the first example embodiment.
Figure 19B:
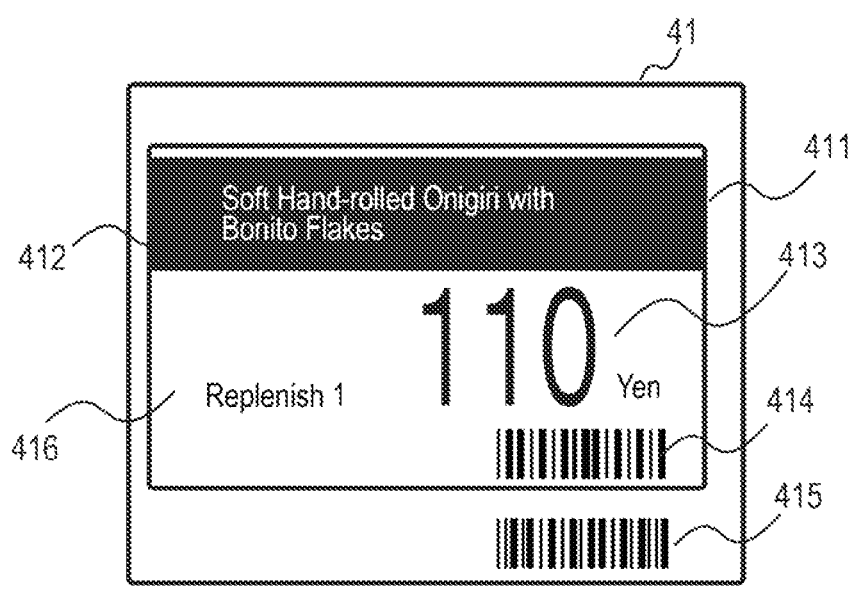
FIG. 19B is a diagram illustrating a relationship between display information on the electronic shelf label and a displaying operation according to the first example embodiment.

FIG. 19A and FIG. 19B are diagrams illustrating a relationship between display information on the electronic shelf label 41 and a displaying operation. FIG. 19A illustrates display information on the electronic shelf label 41 before a displaying operation is started. On the other hand, FIG. 19B illustrates display information after nine products corresponding to the electronic shelf labels 41 are displayed. In FIG. 19A, a message displayed in the display field 416 is "replenish 10". However, in FIG. 19B, the message is updated to "replenish 1". In such a way, since the display information on the display field 416 is updated in accordance with the progress of the displaying operation, operation efficiency of the salesclerk is improved. Note that, when the displaying operation of the product is completed, the display information on the electronic shelf label 41 turns back to the display information of FIG. 14A described above.

Figure 20:
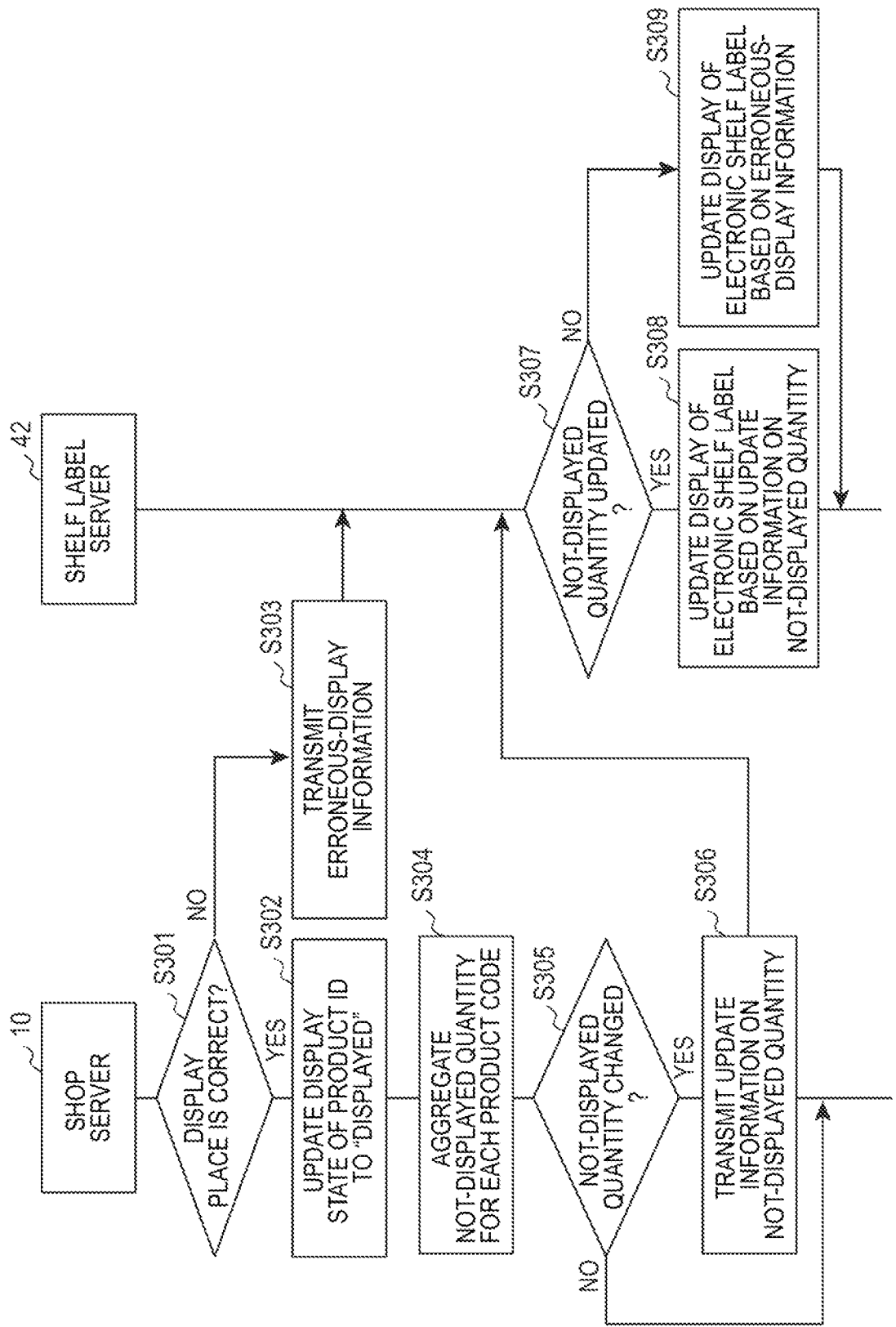
FIG. 20 is a sequence diagram illustrating an example of a display control process of the electronic shelf label performed in the article management system according to the first example embodiment.

Note that, a method of a display control process during the displaying operation is not limited to the method of FIG. 16 described above. For example, error information may be displayed on the electronic shelf label 41 as described below. FIG. 20 is a sequence diagram illustrating an example of a display control process of the electronic shelf label 41 performed in the article management system 1. This process is replaced with the processes from S205 of FIG. 16 described above.

In S301, the shop server 10 references the display shelf management table 101e and the display condition table 101g based on the received product code and the tag sheet ID and determines whether or not the place where the product is displayed is correct. If the shop server 10 determines here that the place where the product is displayed is correct (S301: YES), the process proceeds to S302. On the other hand, if the shop server 10 determines that the place where the product is displayed is not correct (S301: NO), the process proceeds to S303.

In S302, the shop server 10 updates the display state corresponding to the product ID to "displayed" in the display information table 101c. The process proceeds to S304. On the other hand, in S303, the shop server 10 transmits erroneous display information to the shelf label server 42.

In S304, the shop server 10 references the display information table 101c and aggregates the non-display quantity for each product code. The process proceeds to S305.

In S305, the shop server 10 determines whether or not the not-displayed quantity aggregated for each product code is changed. If the shop server 10 determines here that the not-displayed quantity is changed (S305: YES), the process proceeds to S306. On the other hand, if the shop server 10 determines that the not-displayed quantity is unchanged (S305: NO), the process ends.

In S306, the shop server 10 transmits update information on the not-displayed quantity to the shelf label server 42. The update information on the not-displayed quantity includes the current not-displayed quantity, the product code, the shelf position, or the like.

In S307, the shelf label server 42 determines whether or not the update information on the not-displayed quantity is received from the shop server 10. If the shelf label server 42 determines here that the update information on the not-displayed quantity is received from the shop server 10 (S307: YES), the process proceeds to S308. On the other hand, if the shelf label server 42 determines that the update information on the not-displayed quantity is not received from the shop server 10 (S307: NO), the process proceeds to S309.

In S308, the shelf label server 42 updates the display of the electronic shelf label 41 based on the received update information on the not-displayed quantity from the shop server 10.

In S309, the shelf label server 42 updates the display of electronic shelf label 41 based on the received erroneous display information from the shop server 10.

Figure 21:
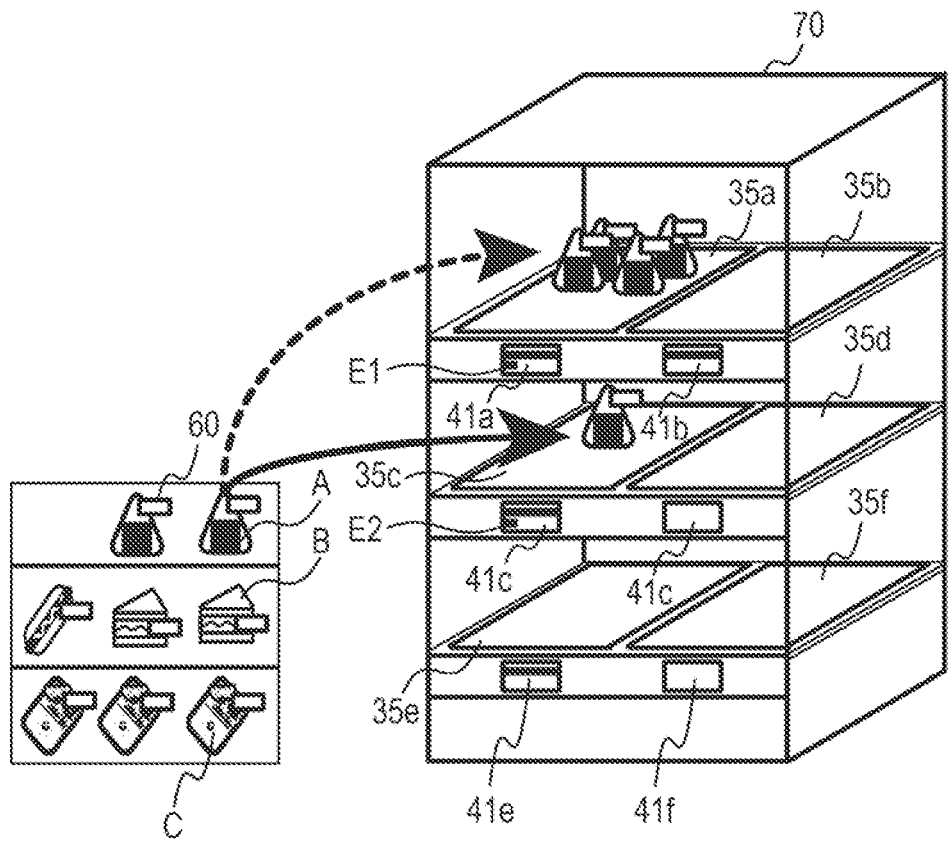
FIG. 21 is a diagram illustrating a case where a product is displayed on a wrong display place in the first example embodiment.

FIG. 21 is a diagram illustrating a case where a product is displayed on a wrong display place. A dashed line arrow illustrated in FIG. 21 illustrates an example of a case where the product A (onigiri) is displayed on the correct display place (the third stage from the bottom and the first column from the left). On the other hand, a solid line arrow illustrates an example of a case where the product A is displayed on the wrong display place (the second stage from the bottom and the first column from the left). In FIG. 21, since the salesclerk displays the product A on a wrong display place, pieces of error information E1 and E2 are displayed on the electronic shelf labels 41a and 41c corresponding to two display places, respectively.

Figure 22:
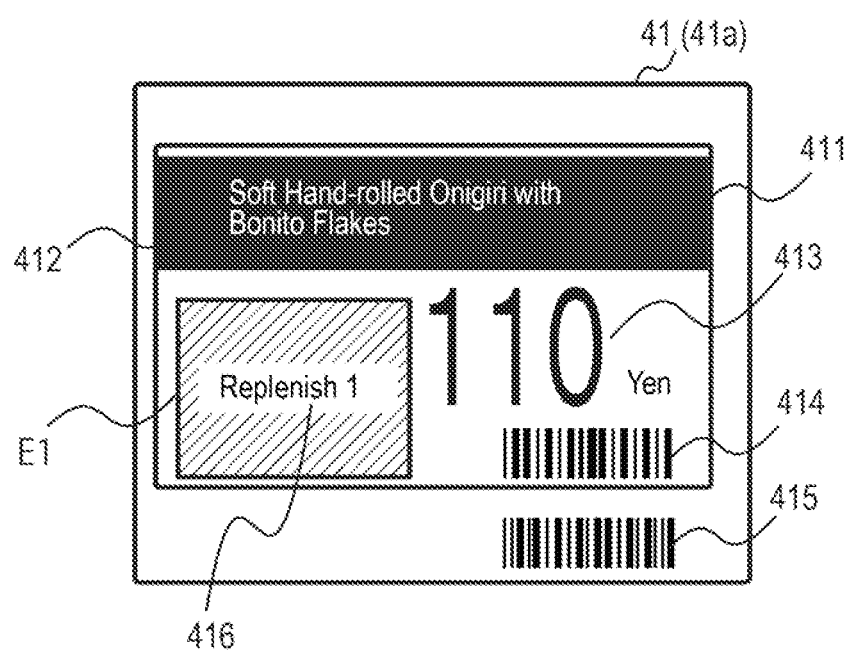
FIG. 22 is a diagram illustrating an example of display information on the electronic shelf label according to the first example embodiment.
Figure 23:
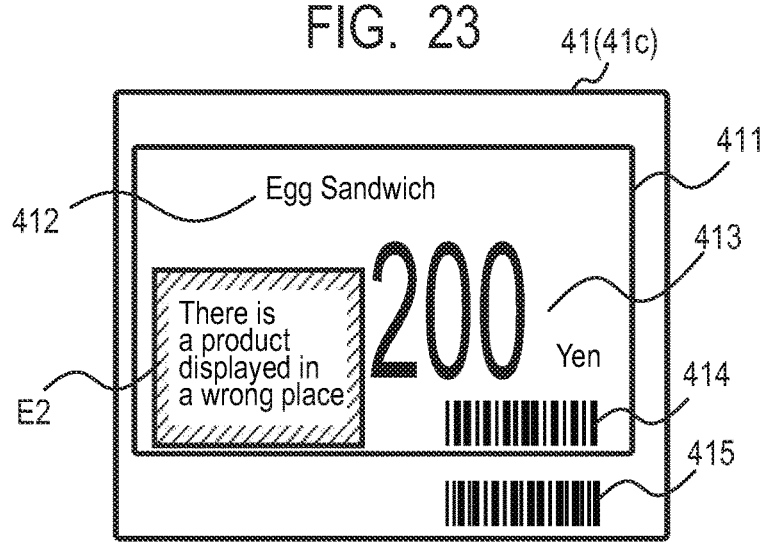
FIG. 23 is a diagram illustrating an example of display information on the electronic shelf label according to the first example embodiment.

FIG. 22 and FIG. 23 are diagrams illustrating an example of display information on the electronic shelf label 41. FIG. 22 illustrates display information on the electronic shelf label 41a provided at a regular display place of the product A illustrated in FIG. 21. The error information E1 is displayed by diagonal lines around the display field 416 of a message in the left side region of the display portion 411 of the electronic shelf label 41a.

On the other hand, FIG. 23 illustrates display information on the electronic shelf label 41c provided at a wrong display place of the product A illustrated in FIG. 21. The error information E2 ("There is a product displayed in a wrong place.") is displayed on the left side region of the display portion 411 of the electronic shelf label 41c.

[Display Control Based on Sales Achievement]

Next, an operation performed in the article management system 1 when the product whose arrival state is the arrived and whose display state is not-displayed is purchased will be described with reference to FIG. 24, FIG. 25A, and FIG. 25B.

Figure 24:
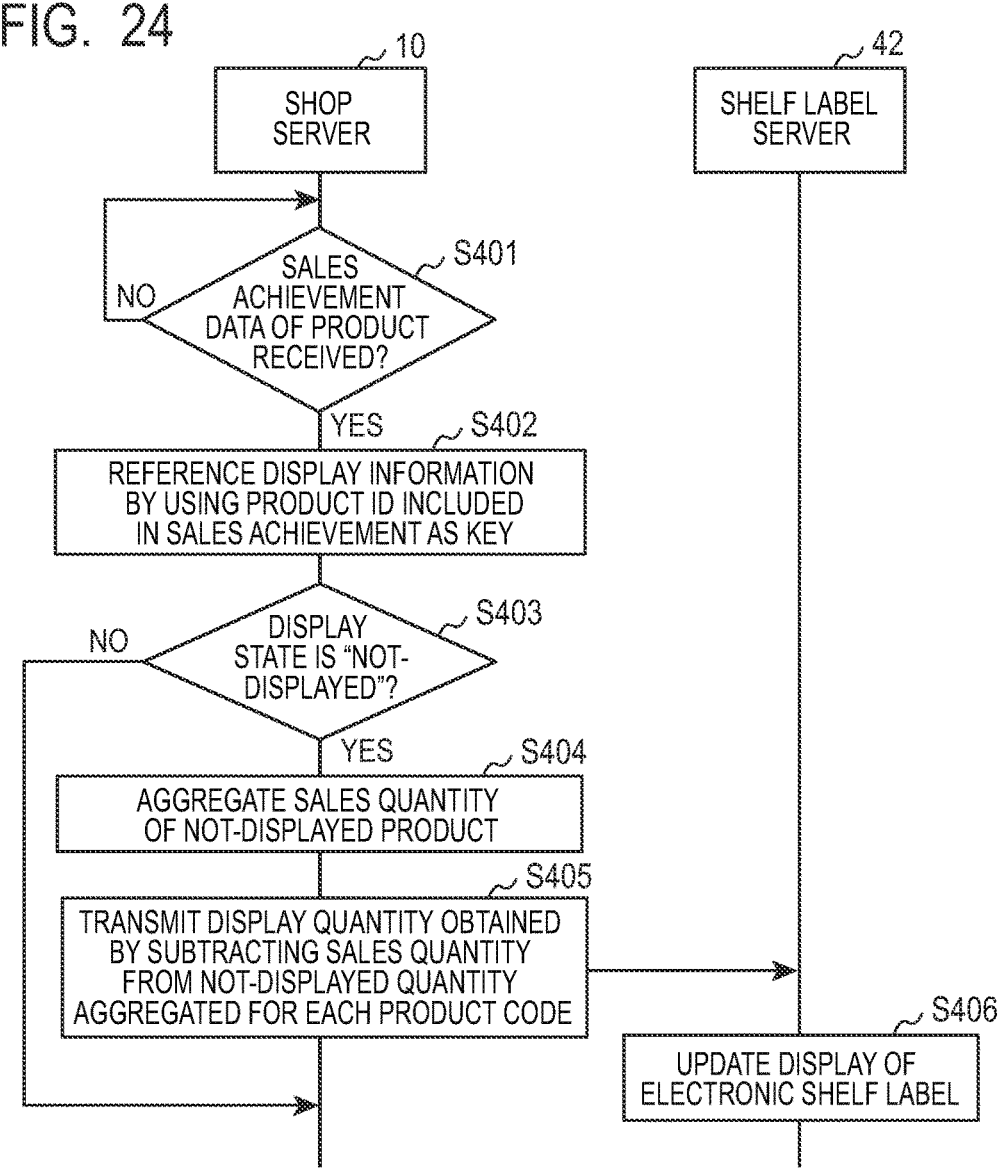
FIG. 24 is a sequence diagram illustrating an example of a display control process of the electronic shelf label performed in the article management system according to the first example embodiment.

FIG. 24 is a sequence diagram illustrating an example of a display control process of the electronic shelf label 41 performed in the article management system 1.

In S401, the shop server 10 determines whether or not the sales achievement data of the product is received from the POS apparatus 20. If the shop server 10 determines here that the sales achievement data is received (S401: YES), the process proceeds to S402. On the other hand, if the shop server 10 determines that the sales achievement data is not received (S401: NO), the process of S401 is repeated.

In S402, the shop server 10 references the display information table 101c by using the product ID included in the sales achievement data as a key.

In S403, the shop server 10 determines whether or not the display state corresponding to the product ID in accordance with the sales product is "not-displayed". If the shop server 10 determines here that the display state is "not-displayed" (S403: YES), the process proceeds to S404. On the other hand, if the shop server 10 determines that the display state is not "not-displayed" (S403: NO), the process ends.

In S404, the shop server 10 aggregates the sales quantity of the not-displayed product from the sales achievement data stored in the sales achievement table 101i. That is, the shop server 10 aggregates the quantity of the product that was sold without being displayed on the display shelf 70 out of the products whose arrival state is "arrived" and whose display state is "not-displayed".

In 405, the shop server 10 transmits, to the shelf label server 42, the display quantity (display instruction) obtained by subtracting the sales quantity from the not-displayed quantity aggregated for each product code.

In S406, the shelf label server 42 updates the display of the electronic shelf label 41 corresponding to the product based on the display quantity received from the shop server 10.

Figure 25A:
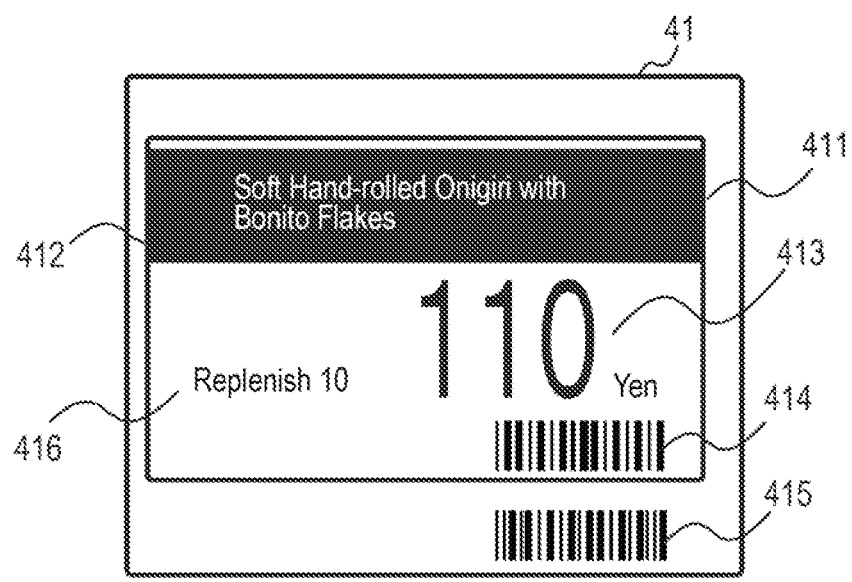
FIG. 25A is a diagram illustrating a relationship between display information on the electronic shelf label and sales achievement according to the first example embodiment.
Figure 25B:
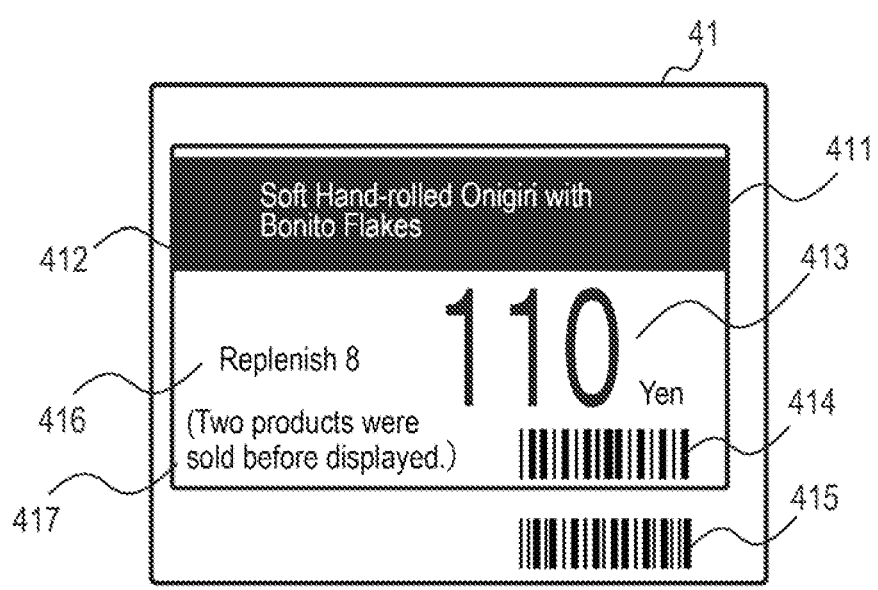
FIG. 25B is a diagram illustrating a relationship between display information on the electronic shelf label and sales achievement according to the first example embodiment.

FIG. 25A and FIG. 25B are diagrams illustrating a relationship between display information on the electronic shelf label 41 and the sales achievement. FIG. 25A illustrates display information on the electronic shelf label 41 when the displaying operation is started. On the other hand, FIG. 25B illustrates display information when the two products corresponding to the electronic shelf labels 41 are sold without being displayed on the display shelf 70. For example, in the convenience store, the target product of a displaying operation (arrived/inspected product) is often placed temporarily near the display shelf 70 while still packed in a carrying box. Thus, a customer may take a desired product from the box before the product is displayed and directly check out at the register counter.

In FIG. 25A, a message displayed on the display field 416 is "replenish 10". On the other hand, in FIG. 25B, the message displayed on the display field 416 is updated to "replenish 8". Moreover, information ("Two products were sold before displayed.") related to the sales achievement is displayed on the display field 417 that is lower part of the display field 416. In such a way, in accordance with not only the progress of the displaying operation but also the sales achievement acquired from the POS system, the display information on the electronic shelf label 41 is updated in real time. Thus, operation efficiency of the salesclerk is improved. Note that, when a displaying operation or sales of the not-displayed product is completed, the display information on the electronic shelf label 41 turns back to the display information of FIG. 14A described above.

[Display Control Based on Display Stock Quantity and in-Shop Stock Quantity]

Next, an operation based on the displayed stock quantity and the in-shop stock quantity performed in the article management system 1 will be described with reference to FIG. 26 to FIG. 28.

Figure 26:
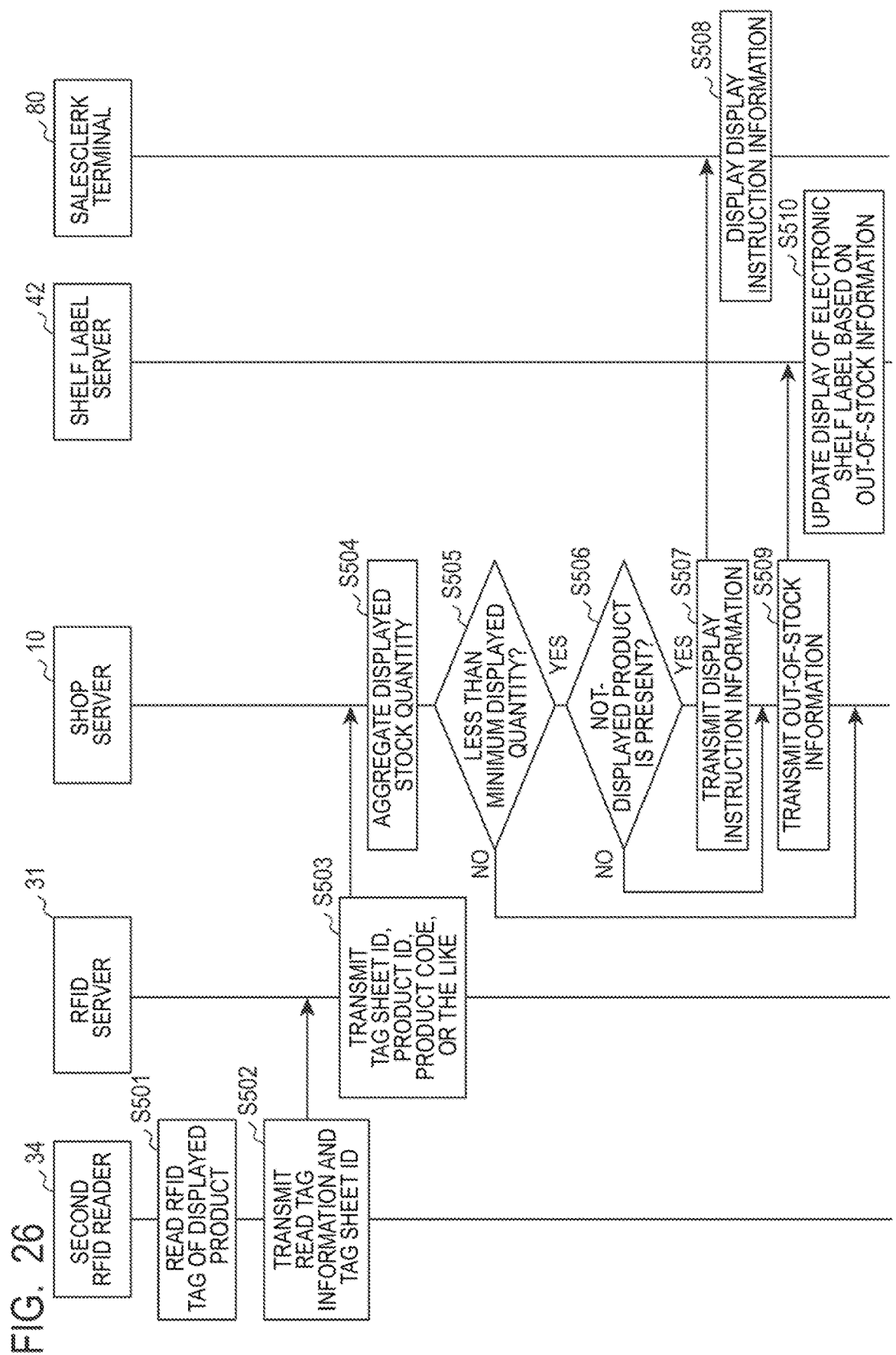
FIG. 26 is a sequence diagram illustrating an example of a display control process of the electronic shelf label performed in the article management system according to the first example embodiment.

FIG. 26 is a sequence diagram illustrating an example of a display control process of the electronic shelf label 41 performed in the article management system 1.

In S501, the second RFID reader 34 reads tag information of the RFID tag 60 of a displayed product via the tag sheet 35.

In S502, the second RFID reader 34 transmits the tag information read from the RFID tag 60 and the tag sheet ID of the tag sheet 35 provided at the reading position.

In S503, the RFID server 31 transmits data including the tag sheet ID, the product ID, the product code, or the like to the shop server 10.

In S504, the shop server 10 aggregates the displayed quantity of the stock displayed on the display shelf 70 (the tag sheet 35) for each product code from data received from the RFID server 31.

In S505, the shop server 10 determines whether or not the displayed stock quantity is less than the minimum display quantity. The minimum display quantity is acquired from the display condition table 101g by using the product code as a key. If the shop server 10 determines here that the displayed stock quantity is less than the minimum display quantity (S505: YES), the process proceeds to S506. On the other hand, if the shop server 10 determines that the displayed stock quantity is larger than or equal to the minimum display quantity (S505: NO), the process ends.

In S506, the shop server 10 references the display information table 101c by using the product code as a key and determines whether or not a not-displayed product (in-shop stock) is present in the shop. If the shop server 10 determines here that a not-displayed product is present (S506: YES), the process proceeds to S507. On the other hand, if the shop server 10 determines here that no not-displayed product is present (S506: NO), the process proceeds to S509.

In S507, the shop server 10 transmits display instruction information to a salesclerk terminal 80. For example, the display instruction information includes the product name, the product code, the shelf position, or the like. The salesclerk terminal 80 is a portable terminal for operations, such as a smartphone or a tablet, carried by the salesclerk and connected to the shop server 10 via an access point (not illustrated). In S508, the salesclerk terminal 80 displays the display instruction information received from the shop server 10.

In S509, the shop server 10 transmits out-of-stock information to the shelf label server 42. For example, the out-of-stock information includes the product code and the shelf label ID.

In S510, the shelf label server 42 updates the display of a predetermined electronic shelf label 41 based on the out-of-stock information received from the shop server 10.

Figure 27:
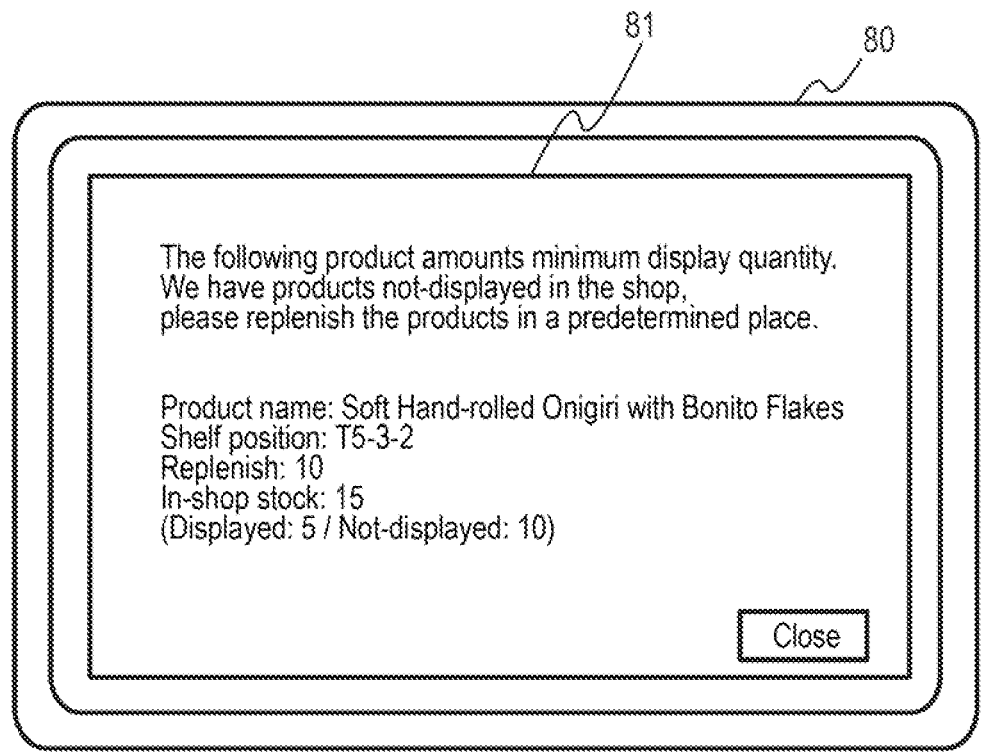
FIG. 27 is a diagram illustrating an example of information notifying a salesclerk terminal according to the first example embodiment.

FIG. 27 is a diagram illustrating an example of information to be notified the salesclerk terminal 80. FIG. 27 illustrates a case where the article management system 1 notifies the salesclerk terminal 80 of replenishment instruction information on the product when the product is out of stock. A massage related to replenishment instruction ("The following product amounts the minimum display quantity. We have not-displayed products in the shop, please replenish the product in a predetermined shelf position"), the product name, the shelf position, the replenishment quantity, and the in-shop stock quantity that are an operation target are displayed on the display screen. The salesclerk may quickly know details of a replenishment operation based on information notified to the salesclerk terminal 80. Note that, while the FIG. 27 illustrates display information in S508 of FIG. 26 (that is, a case of the above out-of-stock state (3)) as an example, also in cases of the out-of-stock states (1) and (2), the operation instruction information corresponding to each state may be displayed on the salesclerk terminal 80 by changing a part of the process of FIG. 26 (not illustrated).

Figure 28:
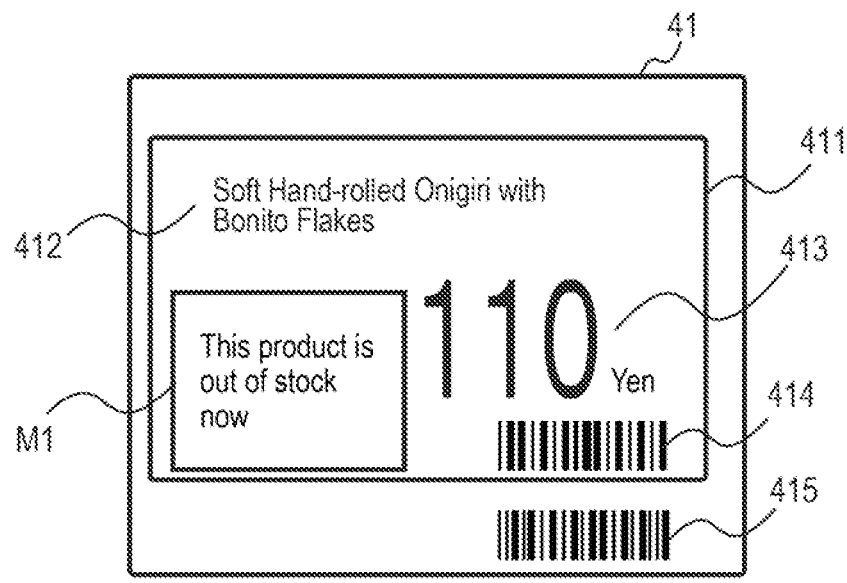
FIG. 28 is a diagram illustrating an example of display information on the electronic shelf label according to the first example embodiment.

FIG. 28 is a diagram illustrating an example of display information on the electronic shelf label 41. FIG. 28 illustrates display information when the product corresponding to the electronic shelf label 41 is out of stock in the display shelf 70. A message M1 ("This product is out of stock now") that notifies the customer and the salesclerk that the product is out of stock is displayed on the left side of the display field 413 of the price. The message M1 is preferably displayed on the electronic shelf label 41 immediately after the customer takes the last product from the display shelf 70. Note that, while FIG. 28 illustrates the display information in S510 of FIG. 26 (that is, a case of the above out-of-stock state (1)) as an example, also in cases of the out-of-stock states (2) and (3), information corresponding to each state for the electronic shelf label 41 may be displayed by changing a part of the process of FIG. 26. For example, when the product is not on the display shelf 70 but is in the in-shop stock (that is, the out-of-stock state (2)), the fact that the in-shop stock is present may be displayed on the electronic shelf label 41 (not illustrated). In such a case, the customer may easily request the salesclerk to arrange the product, and loss of sales opportunities of the product can be suppressed.

[Display Control Based on Use-by Date]

Figure 29:
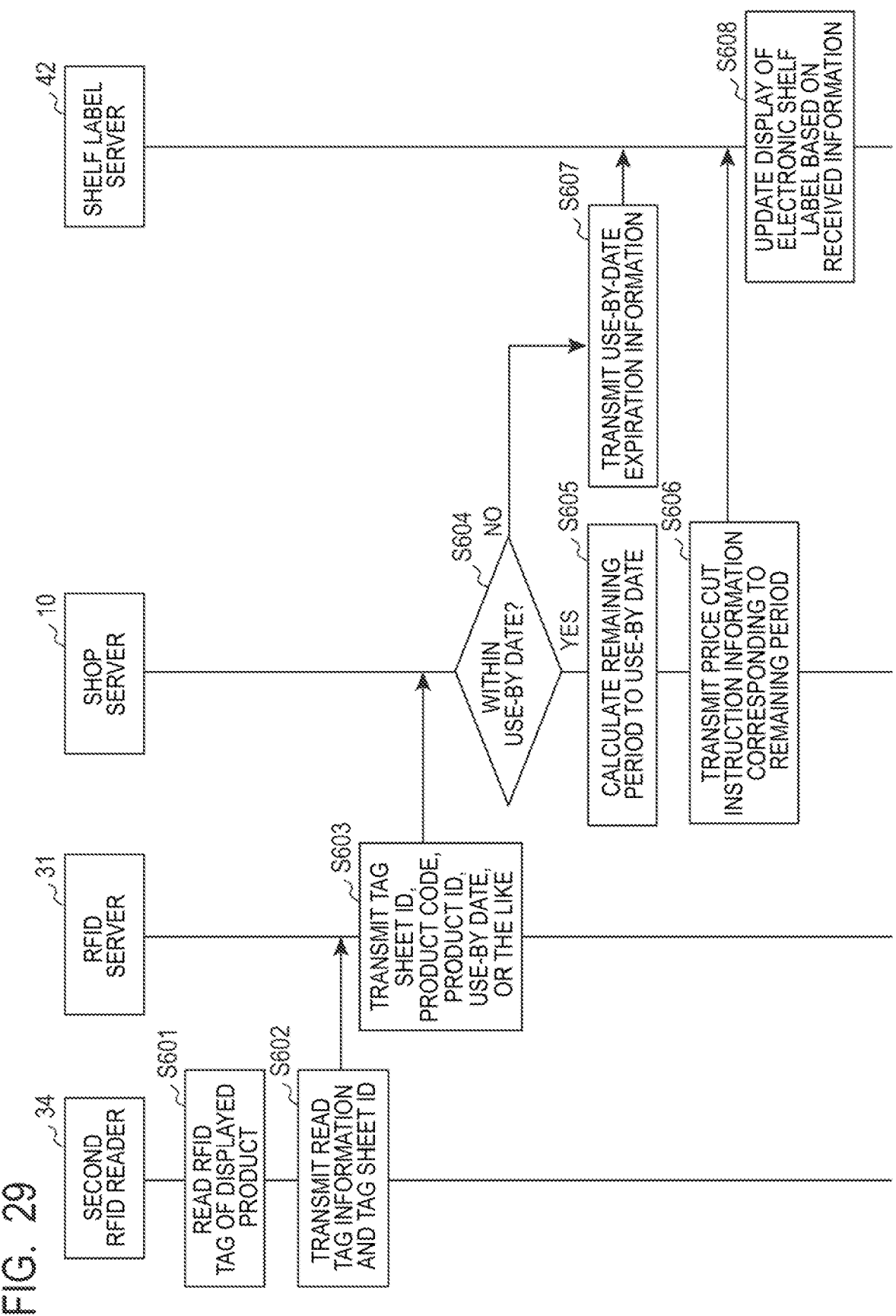
FIG. 29 is a sequence diagram illustrating an example of a display control process of the electronic shelf label performed in the article management system according to the first example embodiment.

Next, an operation in accordance with a use-by date performed in the article management system 1 will be described with reference to FIG. 29 to FIG. 31. FIG. 29 is a sequence diagram illustrating an example of a display control process of the electronic shelf label 41 performed in the article management system 1.

In S601, the second RFID reader 34 reads tag information of the RFID tag 60 of a displayed product via the tag sheet 35.

In S602, the second RFID reader 34 transmits the tag information read from the RFID tag 60 and the tag sheet ID of the tag sheet 35 provided at the reading position.

In S603, the RFID server 31 transmits data including the tag sheet ID, the product ID, the product code, the use-by date, or the like to the shop server 10.

In S604, the shop server 10 compares the use-by date received from the RFID server 31 with the current date and time and determines whether or not the current date and time is within the use-by date of the product. If the shop server 10 determines here that the current date and time is within the use-by date of the product (S604: YES), the process proceeds to S605. On the other hand, if the shop server 10 determines that the current date and time exceeds the use-by date of the product (S604: NO), the process proceeds to S607.

In S605, the shop server 10 calculates a remaining period from the current date and time to the use-by date.

In S606, the shop server 10 references the product master table 101a and the price-cut condition table 101h based on the product code and transmits price-cut instruction information corresponding to the calculated remaining period to the shelf label server 42. The price-cut instruction information includes a sales price after price-cut and the shelf label ID.

In S607, the shop server 10 transmits use-by date expiration information to the shelf label server 42. The use-by date expiration information includes the shelf label ID.

In S608, the shelf label server 42 updates the display of the electronic shelf label 41 based on the information received from the shop server 10.

Figure 30:
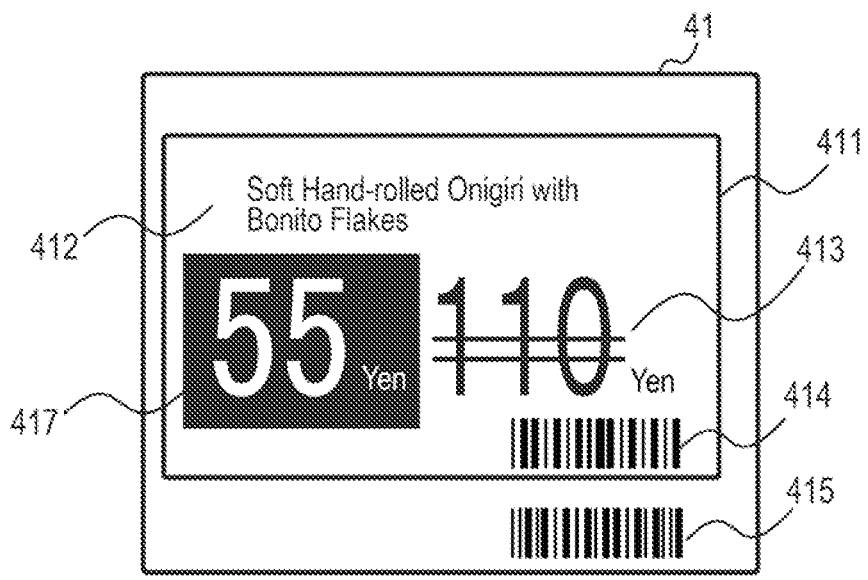
FIG. 30 is a diagram illustrating an example of display information on the electronic shelf label according to the first example embodiment.

FIG. 30 is a diagram illustrating an example of display information on the electronic shelf label 41. FIG. 30 illustrates display information when the product corresponding to the electronic shelf label 41 is close to the use-by date. A normal price (110 yen) and a price-cut price (55 yen) calculated based on a price-cut rate in accordance with the remaining period from the current date and time to the use-by date are displayed on the left side region of the display field 413 of the normal price. Note that, when the remaining period is shorter as time elapses, the price is updated at any time in accordance with a price-cut condition defined in the table described above.

Figure 31:
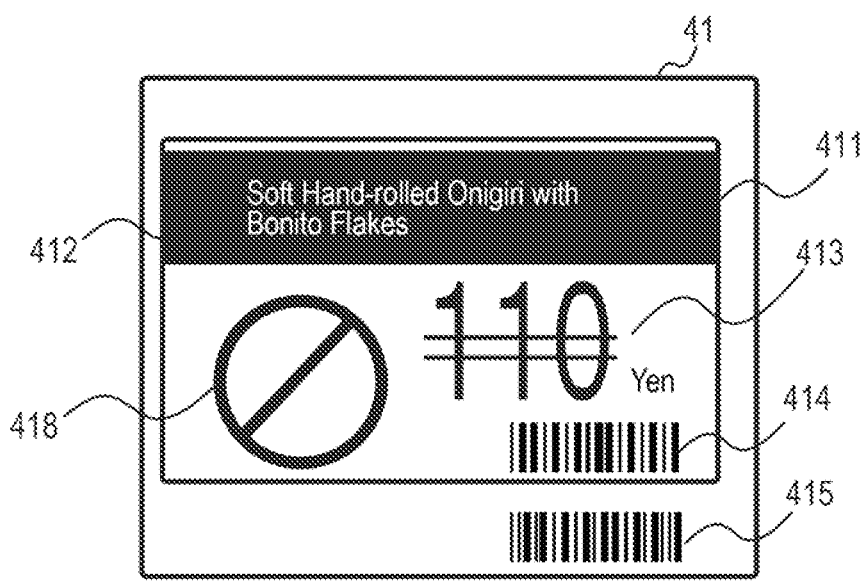
FIG. 31 is a diagram illustrating an example of display information on the electronic shelf label according to the first example embodiment.

FIG. 31 is a diagram illustrating an example of display information on the electronic shelf label 41. FIG. 31 illustrates display information in the case where the use-by date of a product corresponding to the electronic shelf label 41 expires. In the left side region of the display field 413 of the normal price, information indicating expiration of the use-by date is represented by a symbol 418. Note that it is preferable to notify the salesclerk terminal 80 or the like of the information indicating expiration of the use-by date as well, which enables the salesclerk to quickly perform a removal/disposal operation.

Further, when the product that exceeded use-by date and the product that did not exceed use-by date are mixed, the quantity of products that exceeded use-by date can be displayed. For example, the quantity of products that exceeded use-by date can be displayed next to the symbol 418 of FIG. 31 (not illustrated).

[Advertisement Display Related to Selected Product]

Figure 32:
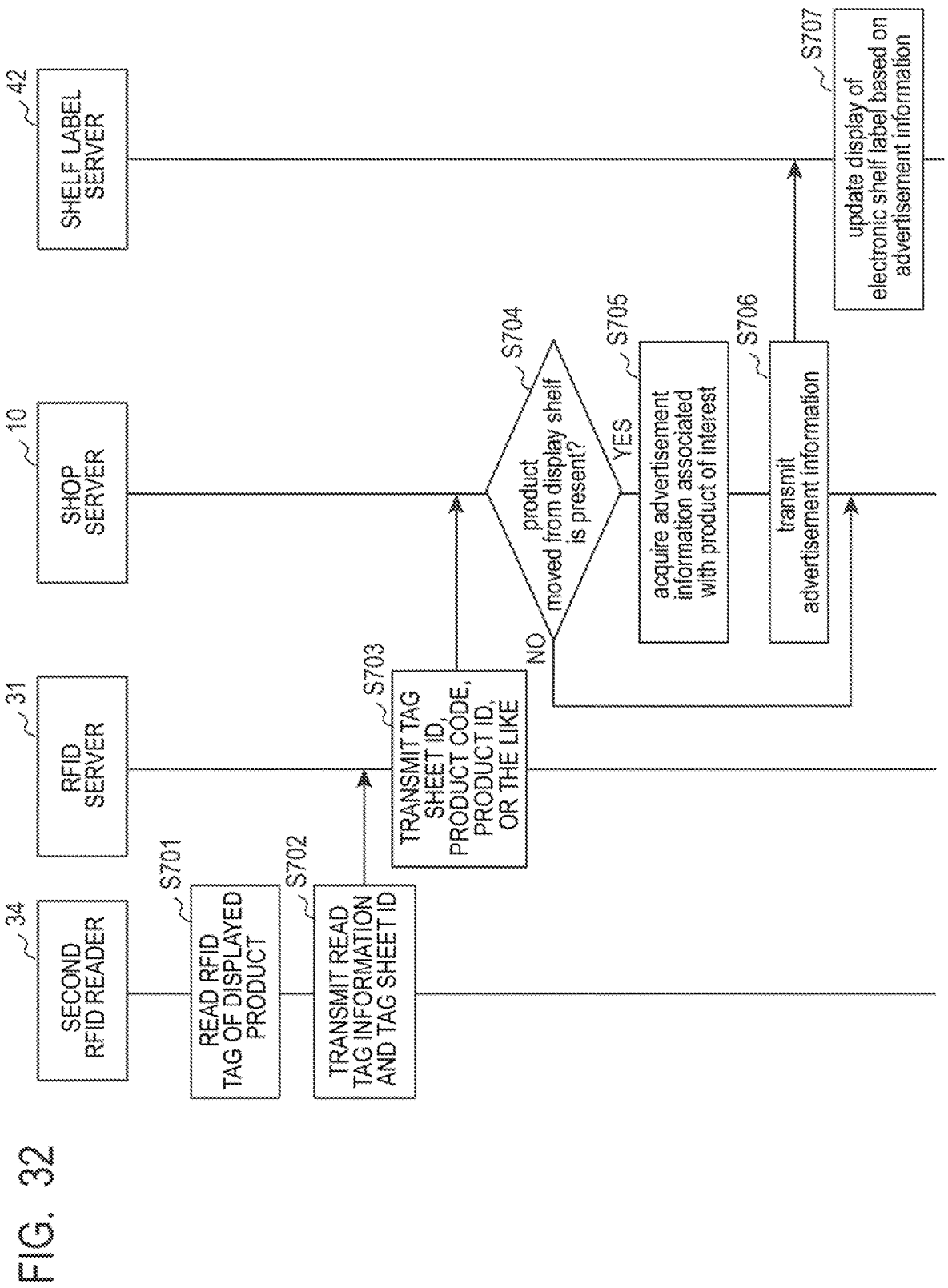
FIG. 32 is a sequence diagram illustrating an example of a display control process of the electronic shelf label performed in the article management system according to the first example embodiment.

FIG. 32 is a sequence diagram illustrating an example of a display control process of the electronic shelf label 41 performed in the article management system 1.

In S701, the second RFID reader 34 reads tag information of the RFID tag 60 of a displayed product via the tag sheet 35.

In S702, the second RFID reader 34 transmits the tag information read from the RFID tag 60 and the tag sheet ID of the tag sheet 35 arranged at the reading position.

In S703, the RFID server 31 transmits data including the tag sheet ID, the product ID, and the product code to the shop server 10.

In S704, the shop server 10 references the display information table 101*c* based on the data received from the RFID server 31 and determines whether or not a product moved from the display shelf 70 is present based on change of the display quantity on the display shelf 70 (the tag sheet 35). If the shop server 10 determines here that a product moved from the display shelf 70 is present (S704: YES), the process proceeds to S705. On the other hand, if the shop server 10 determines that a product moved from the display shelf 70 is not present (S704: NO), the process ends.

In S705, the shop server 10 acquires advertisement information associated with the product code of the product of interest (the moved product). Note that the association between the product code and the advertisement information is performed in the product master table 101*a* or an advertising table (not illustrated) in advance.

In S706, the shop server 10 transmits the acquired advertisement information to the shelf label server 42. In S707, the shelf label server 42 updates display of the electronic shelf label 41 based on the advertisement information received from the shop server 10.

Figure 33:
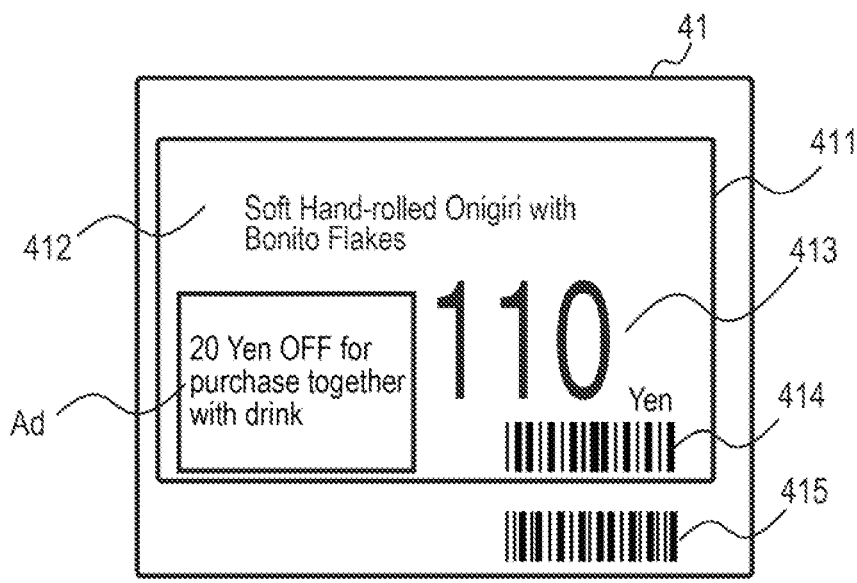
FIG. 33 is a diagram illustrating an example of display information on the electronic shelf label according to the first example embodiment.

FIG. 33 is a diagram illustrating an example of display information on the electronic shelf label 41. FIG. 33 illustrates a case where advertisement information Ad (20 yen off for purchase together with drink) associated with a product is displayed on the left side of the display field 413 of the price when the customer takes the product from the display shelf 70. In such a way, by displaying the advertisement information associated with the corresponding product at a timing when the customer selects a certain product, an advertisement can be delivered efficiently.

According to the article management system 1 of the present example embodiment, operation efficiency when a salesclerk performs article management in a shop can be improved. Specifically, the inspection process can be completed by a simultaneous process at the same time as passage of a plurality of products through the gates 33 from the arrival port. Further, at the same time as completion of an inspection process, a displaying operation instruction is displayed on the electronic shelf label 41 corresponding to the arrived product. Thus, by referencing the display information on the electronic shelf label 41, a salesclerk may easily display the arrived product on a predetermined display place.

Further, the display information on the electronic shelf label 41 is updated on an individual product basis and in real time in accordance with progress of a displaying operation. Thus, a salesclerk may perform a displaying operation while knowing the progress status of the displaying operation.

Moreover, display information on the electronic shelf label 41 does not turn back to the normal display state until the salesclerk displays all the target products on the regular place. Thus, the salesclerk can know on the site whether or not the displaying operation is correct. As a result, man-hours required for a displaying operation of a salesclerk can be significantly reduced.

Second Example Embodiment

Figure 34:
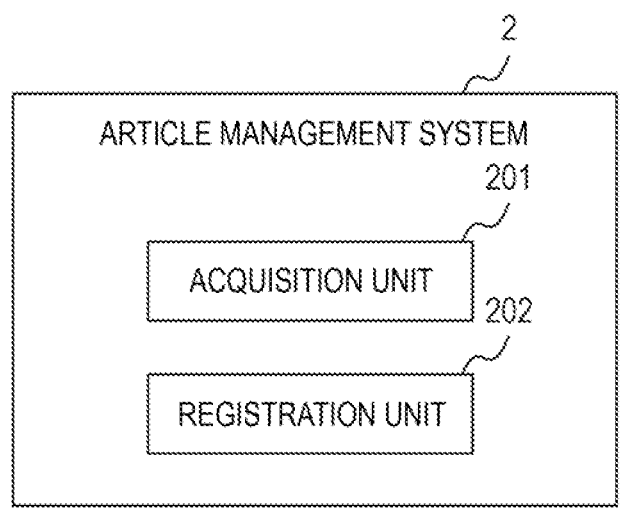
FIG. 34 is a function block diagram of an article management system according to a second example embodiment.

FIG. 34 is a function block diagram of an article management system 2 according to the present example embodiment. The article management system 2 has an acquisition unit 201 and a registration unit 202.

The acquisition unit 201 acquires article identification information, which is read from a storage medium provided to an article that has passed through an article arrival port and identifies the article, by using a wireless communication device provided at the article arrival port of a shop. The registration unit 202 registers article information in the storage medium so that whether or not the arrival state of the article in the shop is an arrived state and whether or not the display state of the article in the shop is a not-displayed state for an article corresponding to the article identification information acquired from the acquisition unit 201 can be extracted from the storage medium storing the article information in which the article identification information, the arrival state, and the display state are associated with each other.

According to the article management system 2 according to the present example embodiment, a salesclerk may efficiently perform an operation when performing article management in a shop.

Third Example Embodiment

Figure 35:
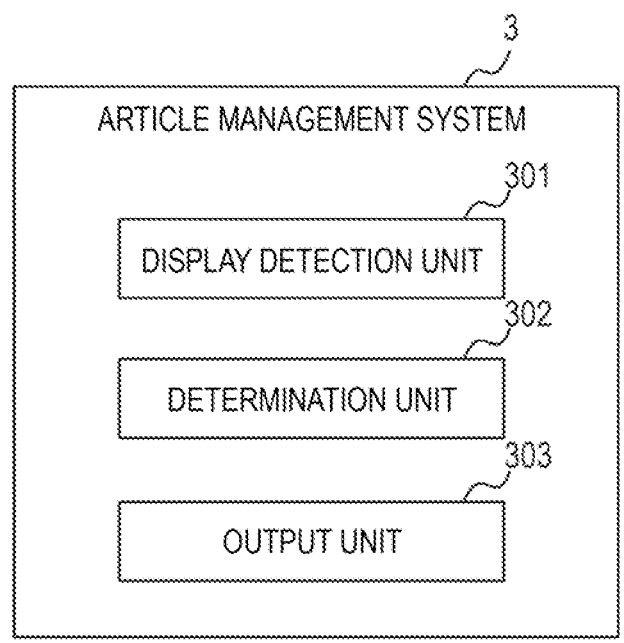
FIG. 35 is a function block diagram of an article management system according to a third example embodiment.

FIG. 35 is a function block diagram of an article management system 3 according to the present example embodiment. The article management system 3 has a display detection unit 301, a determination unit 302, and an output unit 303.

The display detection unit 301 acquires article identification information, which is read from the storage medium provided to an article and identifies the article, by using a wireless communication device provided to a fixture in a shop and detects the display state of the article in the fixture. The determination unit 302 determines whether or not the article identification information on the article whose display state was a not-displayed state is acquired by the display detection unit 301 based on the article information in which the article identification information, the display state, and fixture information related to the fixture where the article is to be displayed are associated with each other and based on the article identification information acquired by the display detection unit 301. When the article identification information on the article that was in the not-displayed state is acquired by the display detection unit 301, the output unit 303 outputs information indicating that the article is in a displayed state.

According to the article management system 3 according to the present example embodiment, operation efficiency when a salesclerk performs article management in a shop can be improved.

Modified Example Embodiment

The present invention is not limited to the example embodiments described above and can be changed as appropriate within the scope not departing from the spirit of the present invention.

In the first example embodiment described above, the configuration in which a product passes through the gates 33, thereby an inspection process is completed, and arrival information and display information are registered in a database has been described. However, inspection may be performed in a different method from the above method, and thereby the arrival information and the display information may be registered in a database. Then, information indicating that a product whose arrival state is the arrived and whose display state is the not-displayed is present may be output by an output method other than displaying on the electronic shelf label 41 by referencing the database.

Further, while an example in which a record having a blank for the product ID of a not-in-stock product is registered in the arrival information table 101b illustrated in FIG. 4 has been described in the above first example embodiment, the registration method is not limited thereto. For example, when the shop server 10 acquires delivery schedule data for each product code/product ID from a client in advance, a record in which both the product code and the product ID are included and the arrival state is "not in stock" may be registered in the arrival information table 101b based on the delivery schedule data at the time of arrival. In such a case, the delivery schedule data acquired from delivery destination is matched with the arrival achievement data that can be acquired at the time of passage between the gates 33, and the arrival state in the record of the product ID may be updated from "not in stock" to "arrived" for a product for which the arrival was confirmed (a product whose tag information was acquired). As described above, when the order quantity and the arrival quantity are different, lacking products can be identified on a product ID basis.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an ASIC, a FPGA, or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on operation system (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above are mere examples of embodiment in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

An article management system comprising:

an acquisition unit that acquires article identification information, which is read from a storage medium provided to an article that passed through an article arrival port and identifies the article, by using a wireless communication device provided at the article arrival port of a shop; and a registration unit that registers article information in a storage device so that whether or not an arrival state of the article in the shop is an arrived state and whether or not a display state of the article in the shop is a not-displayed state for the article corresponding to the article identification information acquired by the acquisition unit are extracted from the storage device storing the article information in which the article identification information, the arrival state, and the display state are associated with each other.

(Supplementary Note 2)

The article management system according to supplementary note 1 further comprising a determination unit that determines whether or not the article for which the arrival state is the arrived state and the display state is the not-displayed state is present based on the article information extracted from the storage device.

(Supplementary Note 3)

The article management system according to supplementary note 2 further comprising a display control unit that, when the article for which the arrival state is the arrived state and the display state is the non-display state is present, controls a display device provided to a fixture where the article is to be displayed so that information indicating that the article is in the non-display state is displayed on the display device.

(Supplementary Note 4)

The article management system according to supplementary note 3 further comprising:

a display detection unit that acquires the article identification information read from the storage medium provided to the article by using a wireless communication device provided to the fixture and detects the display state of the article in the fixture; and an output unit that outputs information based on a determination result obtained by the determination unit, wherein based on the article information further associated with fixture information related to the fixture where the article is to be displayed and based on the article identification information acquired by the display detection unit, the determination unit determines whether or not the article identification information on the article for which the display state was the not-displayed state is acquired by the display detection unit, and wherein the output unit outputs information indicating that the article is in the displayed state when the article identification information on the article that was in the not-displayed state is acquired by the display detection unit.

(Supplementary Note 5)

The article management system according to supplementary note 4 further comprising a display quantity decision unit that decides a display quantity of the article in the fixture based on a not-displayed quantity related to the article that is in the not-displayed state, the fixture information, and the minimum display quantity in the fixture for each article identification information.

(Supplementary Note 6)

The article management system according to supplementary note 4 further comprising:

a sales achievement acquisition unit that acquires sales achievement of the article in the shop; and a display quantity decision unit that, when the sales achievement is acquired for the article that was in the not-displayed state, decides a display quantity of the article in the fixture by subtracting a sales quantity related to the sales achievement from a not-displayed quantity related to the article that was in the not-displayed state.

(Supplementary Note 7)

The article management system according to any one of supplementary notes 4 to 6 further comprising:

a stock quantity acquisition unit that acquires an in-shop stock quantity obtained by aggregating a quantity of the article that is in the not-displayed state and acquires a displayed stock quantity obtained by aggregating a quantity of the article detected in the fixture by the display detection unit; and an out-of-stock determination unit that determines an out-of-stock state of the article based on the displayed stock quantity, wherein the display control unit displays out-of-stock information on the display device when the article is in the out-of-stock state.

(Supplementary Note 8)

The article management system according to any one of supplementary notes 3 to 7 further comprising:

a use-by date acquisition unit that acquires a use-by date of the article from the storage medium; and a price decision unit that decides a sales price of the article based on the use-by date and a current date and time, wherein the display control unit displays the sales price decided by the price decision unit on the display device.

(Supplementary Note 9)

The article management system according to any one of supplementary notes 3 to 7 further comprising:

a use-by date acquisition unit that acquires a use-by date of the article from the storage medium; and an expiration determination unit that determines whether or not a current date and time exceeds the use-by date of the article, and wherein the display control unit displays, for the article that exceeded the use-by date, information indicating that the use-by date expired on the display device.

(Supplementary Note 10)

An article management system comprising;

a display detection unit that acquires article identification information, which is read from a storage medium provided to an article and identifies the article and detects a display state of the article in a fixture, by using a wireless communication device provided to the fixture in a shop;

a determination unit that, based on article information in which the article identification information, the display state, and fixture information related to the fixture where the article is to be displayed are associated with each other and based on the article identification information acquired by the display detection unit, determines whether or not the article identification information on the article for which the display state was a not-displayed state is acquired by the display detection unit; and an output unit that outputs information indicating that the article is in a displayed state when the article identification information on the article that was in the not-displayed state is acquired by the display detection unit.

(Supplementary Note 11)

The article management system according to supplementary note 10 further comprising a display control unit that, when the article for which the display state is the not-displayed state is present, controls a display device provided to the fixture where the article is to be displayed so that information indicating that the article is in the not-displayed state is displayed on the display device.

(Supplementary Note 12)

The article management system according to supplementary note 11 further comprising;

a stock quantity acquisition unit that acquires an in-shop stock quantity obtained by aggregating a quantity of the article that is in the not-displayed state and acquires a displayed stock quantity obtained by aggregating a quantity of the article that is in the displayed state detected in the fixture by the display detection unit; and an out-of-stock determination unit that determines an out-of-stock state of the article based on the displayed stock quantity, wherein the display control unit displays out-of-stock information on the display device when the article is in the out-of-stock state.

(Supplementary Note 13)

The article management system according to supplementary note 11 or 12 further comprising:

a use-by date acquisition unit that acquires a use-by date of the article from the storage medium; and a price decision unit that decides a sales price of the article based on the use-by date and a current date and time, wherein the display control unit displays the sales price decided by the price decision unit on the display device.

(Supplementary Note 14)

The article management system according to supplementary note 11 or 12 further comprising:

a use-by date acquisition unit that acquires a use-by date of the article from the storage medium; and an expiration determination unit that determines whether or not a current date and time exceeds the use-by date of the article, and wherein the display control unit displays, for the article that exceeded the use-by date, information indicating that the use-by date expired on the display device.

(Supplementary Note 15)

The article management system according to any one of supplementary notes 10 to 14 further comprising a display quantity decision unit that decides a display quantity of the article in the fixture based on a not-displayed quantity related to the article that is in the not-displayed state, the fixture information, and the minimum display quantity for each article identification information in the fixture.

(Supplementary Note 16)

The article management system according to any one of supplementary notes 10 to 14 further comprising;

a sales achievement acquisition unit that acquires sales achievement of the article in the shop; and a display quantity decision unit that decides a display quantity of the article in the fixture by subtracting a sales quantity related to the sales achievement from a not-displayed quantity related to the article that is in the not-displayed state when the sales achievement is acquired for the article that was in the not-displayed state.

(Supplementary Note 17)

An article management apparatus comprising:

an acquisition unit that acquires article identification information, which is read from a storage medium provided to an article that passed through an article arrival port and identifies the article, by using a wireless communication device provided at the article arrival port of a shop; and a registration unit that registers article information in a storage device so that whether or not an arrival state of the article in the shop is an arrived state and whether or not a display state of the article in the shop is a not-displayed state for the article corresponding to the article identification information acquired by the acquisition unit are extracted from the storage device storing the article information in which the article identification information, the arrival state, and the display state are associated with each other.

(Supplementary Note 18)

An article management method comprising:

acquiring article identification information, which is read from a storage medium provided to an article that passed through an article arrival port and identifies the article, by using a wireless communication device provided at the article arrival port of a shop; and registering article information in a storage device so that whether or not an arrival state of the article in the shop is an arrived state and whether or not a display state of the article in the shop is a not-displayed state for the article corresponding to the acquired article identification information are extracted from the storage device storing the article information in which the article identification information, the arrival state, and the display state are associated with each other.

(Supplementary Note 19)

A storage medium storing a program that causes a computer to perform:

acquiring article identification information, which is read from a storage medium provided to an article that passed through an article arrival port and identifies the article, by using a wireless communication device provided at the article arrival port of a shop; and registering article information in a storage device so that whether or not an arrival state of the article in the shop is an arrived state and whether or not a display state of the article in the shop is a not-displayed state for the article corresponding to the acquired article identification information are extracted from the storage device storing the article information in which the article identification information, the arrival state, and the display state are associated with each other.

(Supplementary Note 20)

An article management apparatus comprising;

a display detection unit that acquires article identification information, which is read from a storage medium provided to an article and identifies the article, by using a wireless communication device provided to a fixture in a shop and detects a display state of the article in the fixture;

a determination unit that, based on article information in which the article identification information, the display state, and fixture information related to the fixture where the article is to be displayed are associated with each other and based on the article identification information acquired by the display detection unit, determines whether or not the article identification information on the article for which the display state was a not-displayed state is acquired by the display detection unit; and an output unit that outputs information indicating that the article is in a displayed state when the article identification information on the article that was in the not-displayed state is acquired by the display detection unit.

(Supplementary Note 21)

An article management method comprising:

acquiring article identification information, which is read from a storage medium provided to an article and identifies the article, by using a wireless communication device provided to a fixture in a shop and detecting a display state of the article in the fixture;

based on article information in which the article identification information, the display state, and fixture information related to the fixture where the article is to be displayed are associated with each other and based on the article identification information acquired by the wireless communication device provided to the fixture, determining whether or not the article identification information on the article for which the display state was a not-displayed state is acquired; and outputting information indicating that the article is in a displayed state when the article identification information on the article that was in the not-displayed state is acquired.

(Supplementary Note 22)

A storage medium storing a program that causes a computer to perform:

acquiring article identification information, which is read from a storage medium provided to an article and identifies the article, by using a wireless communication device provided to a fixture in a shop and detecting a display state of the article in the fixture;

based on article information in which the article identification information, the display state, and fixture information related to the fixture where the article is to be displayed are associated with each other and based on the article identification information acquired by the wireless communication device provided to the fixture, determining whether or not the article identification information on the article for which the display state was a not-displayed state is acquired; and outputting information indicating that the article is in a displayed state when the article identification information on the article that was in the not-displayed state is acquired.

This application is based upon and claims the benefit of priority from Japanese Patent Application No. 2018-105038, filed on May 31, 2018, the disclosure of which is incorporated herein in its entirety by reference.

REFERENCE SIGNS LIST

1, 2, 3 article management system
10 shop server
11 CPU
12 ROM
13 RAM
14 HDD 15 communication I/F
16 input device
17 output device
18 display
19 bus line
20 POS apparatus
30 RFID system
31 RFID server
32 first RFID reader
33 gate
33a, 33b reader antenna
34 second RFID reader
35 tag sheet
36 reader antenna
40 electronic shelf label system
41 electronic shelf label (display device)
42 shelf label server
43 transceiver
50 network
60 RFID tag
70 display shelf (fixture)
80 salesclerk terminal
101 storage unit
101a product master table
101b arrival information table
101c display information table
101d order information table
101e display shelf management table
101f electronic shelf label management table
101g display condition table
101h price-cut condition table
101i sales achievement table
102 acquisition unit
103 registration unit
104 determination unit
105 display control unit
106 output unit
107 display detection unit
108 display quantity decision unit
109 sales achievement acquisition unit
110 stock quantity acquisition unit
111 out-of-stock determination unit
112 use-by date acquisition unit
113 price decision unit
114 expiration determination unit

What is claimed is:

1. An article management system comprising:
one or more processors; and
a memory storing executable instructions that when executed by the one or more processors, causes the one or more processors to perform as:
acquire article identification information, which is read from a storage medium provided to an article that passed through an article arrival port and identifies the article, by using a wireless communication device provided at the article arrival port of a shop; and
register article information in a storage device so that whether or not an arrival state of the article in the shop is an arrived state and whether or not a display state of the article in the shop is a not-displayed state for the article corresponding to the article identification information are extracted from the storage device storing the article information in which the article identification information, the arrival state, and the display state are associated with each other;
determine whether or not the article for which the arrival state is the arrived state and the display state is the not-displayed state is present based on the article information extracted from the storage device; and
when the article for which the arrival state is the arrived state and the display state is the non-display state is present, control a display device provided to a fixture where the article is to be displayed so that information indicating that the article is in the non-display state is displayed on the display device.

2. The article management system according to claim 1, wherein the one or more processor is configured to execute the instructions to:
acquire the article identification information read from the storage medium provided to the article by using a wireless communication device provided to the fixture and detects the display state of the article in the fixture; and
output information based on an obtained determination result,
wherein based on the article information further associated with fixture information related to the fixture where the article is to be displayed and based on the acquired article identification information, the at least one processor determines whether or not the article identification information on the article for which the display state was the not-displayed state is acquired, and
wherein the one or more processor outputs information indicating that the article is in the displayed state when the article identification information on the article that was in the not-displayed state is acquired.

3. The article management system according to claim 2, wherein the one or more processor is further configured to decide a display quantity of the article in the fixture based on a not-displayed quantity related to the article that is in the not-displayed state, the fixture information, and the minimum display quantity in the fixture for each article identification information.

4. The article management system according to claim 2, wherein the one or more processor is further configured to:
acquire sales achievement of the article in the shop; and
when the sales achievement is acquired for the article that was in the not-displayed state, decide a display quantity of the article in the fixture by subtracting a sales quantity related to the sales achievement from a not-displayed quantity related to the article that was in the not-displayed state.

5. The article management system according to claim 2, wherein the one or more processor is further configured to:
acquire an in-shop stock quantity obtained by aggregating a quantity of the article that is in the not-displayed state and acquires a displayed stock quantity obtained by aggregating a quantity of the article detected in the fixture; and
determine an out-of-stock state of the article based on the displayed stock quantity,
wherein a display controller displays out-of-stock information on the display device when the article is in the out-of-stock state.

6. The article management system according to claim 1 further comprising:
wherein the one or more processor is further configured to:
a use-by date acquirer that acquires a use-by date of the article from the storage medium; and
a price decider that decides a sales price of the article based on the use-by date and a current date and time, wherein the display controller displays the sales price decided by the price decider on the display device.

7. The article management system according claim 1 further comprising:
a use-by date acquirer that acquires a use-by date of the article from the storage medium; and
an expiration determiner that determines whether or not a current date and time exceeds the use-by date of the article, and
wherein the display controller displays, for the article that exceeded the use-by date, information indicating that the use-by date expired on the display device.

8. An article management system comprising;
one or more processors; and
a memory storing executable instructions that when executed by the one or more processors, causes the one or more processors to perform as:
acquires an article identification information, which is read from a storage medium provided to an article and identifies the article and detects a display state of the article in a fixture, by using a wireless communication device provided to the fixture in a shop;
determines based on an article information in which the article identification information, the display state, and fixture information related to the fixture where the article is to be displayed are associated with each other and based on the acquired article identification information, determines whether or not the article identification information on the article for which the display state was a not-displayed state; and
outputs information indicating that the article is in a displayed state when the article identification information on the article that was in the not-displayed state.

9. The article management system according to claim 8, wherein the one or more processor is further configured to control a display device provided to the fixture where the article is to be displayed so that information indicating that the article is in the not-displayed state is displayed on the display device when the article for which the display state is the not displayed state is present.

10. The article management system according to claim 9; wherein the one or more processor is further configured to:
acquire an in-shop stock quantity obtained by aggregating a quantity of the article that is in the not-displayed state and acquires a displayed stock quantity obtained by aggregating a quantity of the article that is in the displayed state detected in the fixture; and
determine an out-of-stock state of the article based on the displayed stock quantity,
wherein the at least one processor displays out-of-stock information on the display device when the article is in the out-of-stock state.

11. The article management system according to claim 9, wherein the one or more processor is further configured to:
acquire a use-by date of the article from the storage medium; and
decide a sales price of the article based on the use-by date and a current date and time,
wherein the one or more processor displays the decided sales price decided on the display device.

12. The article management system according to claim 9, wherein the one or more processor is further configured to:
acquire a use-by date of the article from the storage medium; and
determine whether or not a current date and time exceeds the use-by date of the article, and
wherein the one or more processor displays, for the article that exceeded the use-by date, information indicating that the use-by date expired on the display device.

13. The article management system according to claim 8, wherein the one or more processor is further configured to decide a display quantity of the article in the fixture based on a not-displayed quantity related to the article that is in the not-displayed state, the fixture information, and the minimum display quantity for each article identification information in the fixture.

14. The article management system according to claim 8, wherein the one or more processor is further configured to:
acquire sales achievement of the article in the shop; and
decide a display quantity of the article in the fixture by subtracting a sales quantity related to the sales achievement from a not-displayed quantity related to the article that is in the not-displayed state when the sales achievement is acquired for the article that was in the not-displayed state.

15. An article management apparatus comprising:
at least one memory configured to store instructions; and
at least one processor configured to execute the instructions to:
acquire article identification information, which is read from a storage medium provided to an article that passed through an article arrival port and identifies the article, by using a wireless communication device provided at the article arrival port of a shop; and
register article information in a storage device so that whether or not an arrival state of the article in the shop is an arrived state and whether or not a display state of the article in the shop is a not-displayed state for the article corresponding to the article identification information are extracted from the storage device storing the article information in which the article identification information, the arrival state, and the display state are associated with each other;
determine whether or not the article for which the arrival state is the arrived state and the display state is the not-displayed state is present based on the article information extracted from the storage device; and
when the article for which the arrival state is the arrived state and the display state is the non-display state is present, control a display device provided to a fixture where the article is to be displayed so that information indicating that the article is in the non-display state is displayed on the display device.

* * * * *